US012650499B2

(12) United States Patent　　　(10) Patent No.:　US 12,650,499 B2
Maierbacher et al.　　　　　　　(45) Date of Patent:　　　Jun. 9, 2026

(54) LIGHT DETECTION SYSTEM AND METHODS THEREOF

(71) Applicant: OSRAM GmbH, Munich (DE)

(72) Inventors: Gerhard Maierbacher, Munich (DE); Bernhard Siessegger, Unterschleissheim (DE)

(73) Assignee: OSRAM GmbH, Munich (DE)

( * ) Notice: Subject to any disclaimer, the term of this patent is extended or adjusted under 35 U.S.C. 154(b) by 545 days.

(21) Appl. No.: 18/261,904

(22) PCT Filed: Dec. 20, 2021

(86) PCT No.: PCT/EP2021/086714
§ 371 (c)(1),
(2) Date: Jul. 18, 2023

(87) PCT Pub. No.: WO2022/156975
PCT Pub. Date: Jul. 28, 2022

(65) Prior Publication Data
US 2024/0302507 A1　　　Sep. 12, 2024

(30) Foreign Application Priority Data
Jan. 20, 2021　(DE) ......................... 102021101139.6

(51) Int. Cl.
*G01S 7/487*　　　(2006.01)
*G01S 7/4861*　　(2020.01)
*G01S 17/10*　　　(2020.01)
(52) U.S. Cl.
CPC .......... *G01S 7/4876* (2013.01); *G01S 7/4861* (2013.01); *G01S 17/10* (2013.01)
(58) Field of Classification Search
CPC ....... G01S 17/10; G01S 7/4861; G01S 7/4876
See application file for complete search history.

(56) References Cited

U.S. PATENT DOCUMENTS 4,717,252 A　　1/1988　Halldorsson et al.
2003/0025631 A1*　2/2003　Kim ...................... G01S 5/0221
　　　　　　　　　　　　　　　　　　342/135
(Continued)

FOREIGN PATENT DOCUMENTS

CN　　　111352095 A　　6/2020
DE　　　3425098 A1　　1/1986
(Continued)

OTHER PUBLICATIONS

"Optical Signal Processing Using Tunable Delay Elements Based on Slow Light"—Willner et al., IEEE Journal of Selected Topics in Quantum Electronics, vol. 14, No. 3, May/Jun. 2008 (Year: 2008).*
(Continued)

*Primary Examiner* — Mainul Hasan
(74) *Attorney, Agent, or Firm* — Slater Matsil, LLP

(57) ABSTRACT

Embodiments provide a light detection system including a detector configured to provide a received light signal and a processing circuit configured to provide a plurality of branched signals, each being representative of the received light signal and each being time delayed to one another and with respect to a non-delayed branched signal, wherein a delay period between the plurality of branched signals is smaller than a duration of the received light signal, and wherein the delay period between the plurality of branched signals is chosen such that peaks of the branched signals overlap in time and to sum up the plurality of branched signals including the non-delayed branched signal with one another to provide a combined signal, wherein the plurality of branched signals differ from one another in such a way that, as a result of a summation, respective signal components of the plurality of branched signals combine in a constructive manner and respective noise components of the
(Continued)

plurality of branched signals combine in an at least partially destructive manner.

16 Claims, 21 Drawing Sheets

(56)                    References Cited

U.S. PATENT DOCUMENTS

| | | | |
|---|---|---|---|
| 2005/0008289 A1* | 1/2005 | Shahar | G02F 3/00 |
| | | | 385/27 |
| 2014/0103994 A1 | 4/2014 | Chiesi et al. | |
| 2017/0242108 A1 | 8/2017 | Dussan et al. | |
| 2020/0158825 A1* | 5/2020 | Meissner | G01S 17/931 |
| 2020/0264287 A1* | 8/2020 | Graefling | G01S 17/42 |
| 2021/0072382 A1 | 3/2021 | Kashmiri | |
| 2021/0278513 A1* | 9/2021 | Barber | G01S 7/4917 |
| 2021/0333360 A1* | 10/2021 | Luo | G01S 7/4802 |
| 2025/0314776 A1* | 10/2025 | Wang | G01S 7/4913 |

FOREIGN PATENT DOCUMENTS

| | | |
|---|---|---|
| DE | 102016213979 A1 | 2/2018 |
| DE | 102017106134 A1 | 9/2018 |
| WO | 2019149688 A1 | 8/2019 |

OTHER PUBLICATIONS

"An experiment of mutual interference between automotive LIDAR scanners"—Kim et al., 2015 12th International Conference on Information Technology—New Generations (Year: 2015).*

* cited by examiner

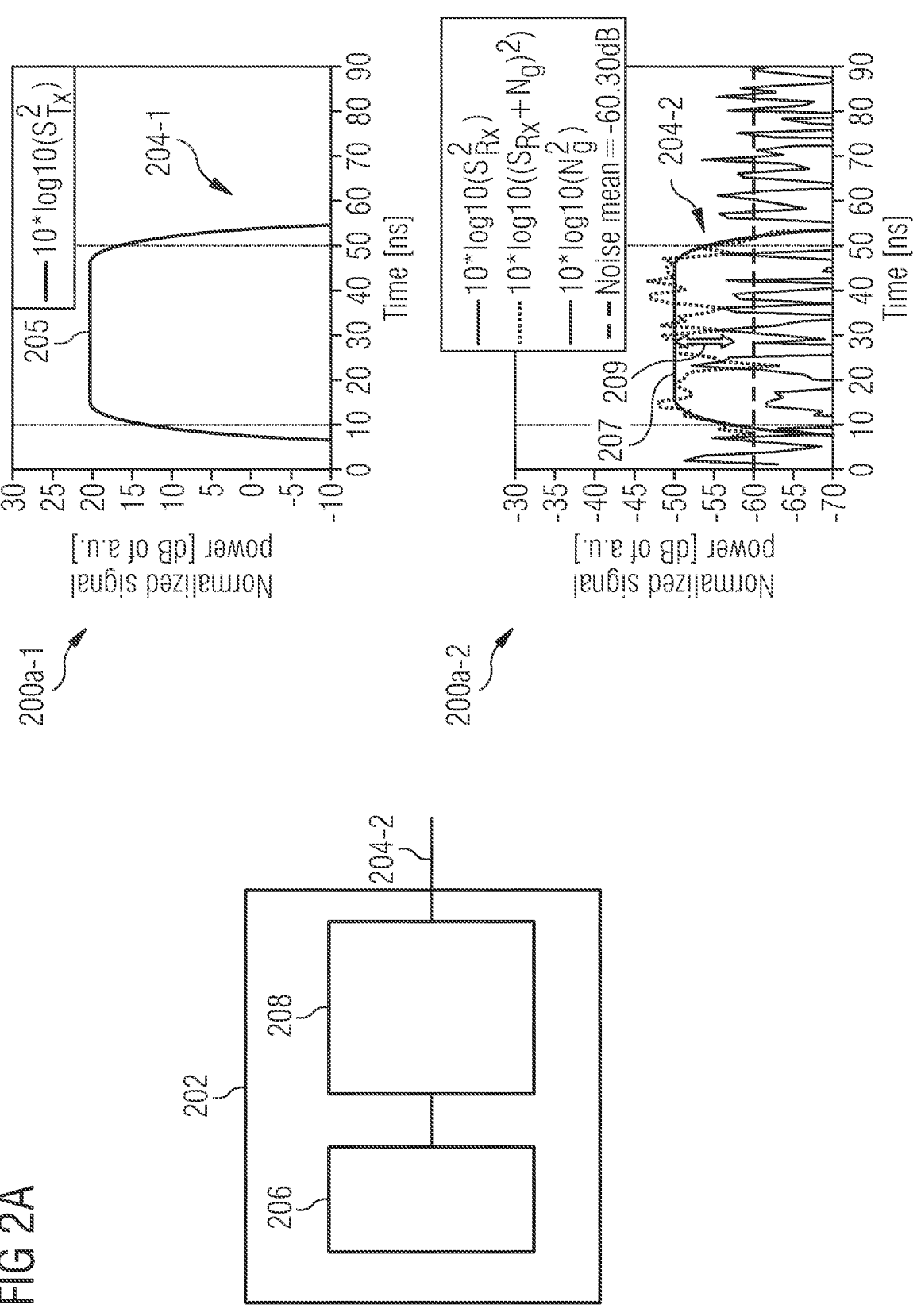

LIGHT DETECTION SYSTEM AND METHODS THEREOF

CROSS-REFERENCE TO RELATED APPLICATIONS

This patent application is a national phase filing under section 371 of PCT/EP2021/086714, filed Dec. 20, 2021, which claims the priority of German patent application 10 2021 101 139.6, filed Jan. 20, 2021, each of which is incorporated herein by reference in its entirety.

TECHNICAL FIELD

The disclosure relates to a light detection system and methods thereof (e.g., a method of detecting a light signal), and to a LIDAR ("Light Detection and Ranging") system including a light detection system.

BACKGROUND

Light detection and ranging is a sensing technique that is used, for example, in the field of autonomous driving for providing detailed information about the surrounding of an automated or partially automated vehicle. Light is used to scan a scene and determine the properties (e.g., the location, the speed, the direction of motion, and the like) of the objects present therein. A LIDAR system typically uses the time-of-flight (ToF) of the emitted light to measure the distance to an object. A conventional system for measuring direct time-of-flight may use a single laser pulse for ranging. The laser pulse may have high peak power to provide a good signal-to-noise ratio (SNR), and short duration to ensure eye safety. These features of the laser pulse lead to strict operation requirements for a laser diode and laser driver used to generate the laser pulse. The laser diode needs to withstand extremely high peak currents, and the laser driver needs to be very fast and highly efficient (illustratively, with low power loss). These operation requirements lead to a highly complex and expensive system, in which parasitic effects need to be well controlled.

SUMMARY

Various embodiments are related to a simple and cost-efficient detection scheme to improve (e.g., increase) the signal-to-noise ratio associated with a detected light signal. The detection scheme may be based on combining together a plurality of representations of the detected light signal, in such a way that a signal component associated with the light signal is enhanced with respect to a noise component associated with the light signal. The combination (e.g., the summation or superposition) is based on an adaptation of the various representations of the detected light signal, in a way that provides a constructive combination of the respective signal components and an at least partially destructive combination of the respective noise components. The enhancement of signal component provided by the detection scheme described herein may provide using (e.g., for ranging) a light signal having a lower peak power and having a longer duration compared to a conventional ranging signal. The light signal may thus be easier to generate (e.g., in terms of lower system complexity and lower cost), while maintaining a same energy as a conventional ranging signal. The detection scheme may ensure that the signal-to-noise ratio at the detector is sufficient for distinguishing the light signal from the noise. The detection scheme described herein may be provided, for example, for time-to-digital conversion architectures.

In some embodiments, the detection scheme may include modifying the various representations of the detected light signal in such a way that they differ from one another to provide, as a result of the combination, the desired enhancement of the resulting signal component with respect to the resulting noise component. In the context of the present description, the modification of a representation of the detected light signal may include delaying that representation (e.g., with respect to another representation, or with respect to a reference point) Illustratively, a suitably selected delay (or a plurality of suitably selected delays) may provide the desired constructive combination of the signal components and the desired destructive combination of the noise components. It is however understood that delaying a representation is only an example of a possible modification to provide the effect described herein, and other suitably selected modifications may be possible. As a further example, a modification may include a scaling of the representation (e.g., in terms of amplitude), e.g. with suitably selected scaling factors.

Various embodiments are related to a light detection system configured to carry out the adapted detection scheme described herein, e.g. the adapted processing of a light signal. The light detection system may be configured to enhance a signal component of a detected light signal by modifying a plurality of representations of the detected light signal and combining them together in such a way to provide a constructive combination of the respective signal components and an at least partially destructive combination of the respective noise components. The light detection system described herein may be implemented with a relatively low system complexity, e.g. without requiring expensive components (for example, the light detection system may operate without a high-speed analog-to-digital converter).

The detection scheme described herein may provide exploiting power that is distributed over long pulse durations by improving the signal-to-noise ratio at the detector side. In some aspects, the detection scheme may be used with multi-pulse systems (with known or unknown pulse configuration). A multi-pulse system may include, for example, a system capable of modulating and/or controlling the output power (illustratively, more pulses may provide more output power). As another example, a multi-pulse system may include a system that allows reducing crosstalk, e.g. by using mutually optimized multi-pulse signals with good auto-correlation and/or cross-correlation properties. As a further example, a multi-pulse system may include a system that allows mitigating alien signals, e.g. by identifying its own signals' signatures. As a further example, a multi-pulse system may include a system capable of "inter-system" signalling and data communication, e.g. by encoding data onto multi-pulse signals. As a further example, a multi-pulse system may include a system that uses multi-pulse signals for channel estimation.

In the context of the present description, "good auto-correlation properties" may be used to describe a signal, which provides a cross-correlation below a predefined auto-correlation threshold in case the signal is correlated with a shifted version of itself (e.g., time-shifted or delayed version of itself, illustratively with a time-shift other than 0). The auto-correlation threshold may be selected depending on the intended application. By way of example, the auto-correlation threshold may be smaller than 0.5, for example smaller than 0.1, for example substantially 0. In the context of the present description, "good cross-correlation properties" may be used to describe a signal, which provides a cross-correlation below a predefined cross-correlation threshold in case the signal is cross-correlated with another signal (illustratively, with a different signal). The cross-correlation threshold may be selected depending on the intended application. By way of example, the cross-correlation threshold may be less than 0.5, for example less than 0.1, for example substantially 0. The signal may be, for example, a representation of a received light signal, e.g. a branched signal, as described in further detail below.

The terms "representation" or "representative of" may be used herein to describe a signal (e.g., a voltage signal or a current signal) "representing" another signal (e.g., a light signal). A signal being a representation of another signal may include same signal features (e.g., same peaks, same valleys, etc.) as the other signal. Illustratively, a signal being a representation of another signal may be understood as replicating the signal features of the other signal, or as encoding the signal features of the other signal in such a way that, upon decoding the signal, the other signal may be obtained.

The term "branched signals" may be used herein to describe a plurality of signals that are distributed over a plurality of processing paths (in other words, a plurality of processing lines). A "branched signal" may be associated with a respective processing path, e.g. may propagate along the respective processing path, and another "branched signal" may be associated with a different processing path. The plurality of "branched signals" may be equal to one another at the beginning of the respective processing path, and may be different from one another at the end of the respective processing path. Illustratively, the term "branched" may describe the distribution (in other words, the allocation) of a same signal over a plurality of processing paths, to provide different processing. A "branched signal" may also be referred to herein as "distributed signal", "subdivided signal", or "processed signal".

The terms "combine" or "combination" may be used herein to describe an operation in which a plurality of signals (e.g., a plurality of branched signals) are used as an input to provide a single (combined) signal as an output. "Combining" a plurality of signals as used herein may be understood as including any suitable operation to provide a "combined" output from a plurality of signals. In some aspects, "combining" a plurality of signals with one another may include superimposing the plurality of signals with one another, or summing the plurality of signals with one another.

The terms "delay", "delaying", "time-shift", or "time-shifting" may be used herein to describe an operation on a signal that shifts the features of that signal (e.g., the peaks (the pulses), the valleys, etc.) in time with respect to a reference point (e.g., with respect to another signal). Illustratively, a first signal and a second signal may be equal to one another, and after "delaying" or "time-shifting" the first signal with respect to the second signal, the signal features of the first signal may be shifted in time with respect to the signal features of the second signal.

The terms "signal component" and "noise component" may be used herein to describe the elements of a signal (e.g., of a light signal, of a branched signal, of a combined signal, etc.). A "signal component" may be understood as an element (or a plurality of elements, in other words, one or more signal features) purposefully present in the signal. Illustratively, a "signal component" may include the part of the signal used (or to be used) for a desired operation (e.g., ranging, channel estimation, etc.). A "noise component" may be understood as an element undesirably present in the signal, e.g. resulting from various noise sources that the signal may encounter during propagation (e.g., during travelling towards a detector). A "noise component" may include, for example, thermal noise, shot noise, noise due to solar light, noise due to light coming from "foreign" light sources (e.g., from a different LIDAR system), and the like. In some aspects, a signal may be emitted including (only) a desired "signal component", to which a "noise component" may be superimposed during the propagation of the signal.

In the following, some values (e.g., associated with a power or a power level of a signal) may be provided according to a linear scale (e.g., in watts W), or according to a logarithmic scale (e.g., in decibel dB or decibel watts dBW). In some embodiments, the values expressed according to the linear scale may be converted to corresponding values according to the logarithmic scale, assuming a reference value to which the values are compared to (e.g., 1 W). As an example, in case of a power PL expressed according to a linear scale, a corresponding power PD expressed in a logarithmic scale may be derived as $P_D = 10 * \log_{10}(P_L/P_R)$, where PR may be a reference power (e.g., 1 W). It is also understood that values expressed in dBW may be combined (e.g., added or subtracted) with values expressed in dB, as commonly known in the art. In some of the graphs, a signal may be represented in terms of arbitrary units (a.u.) or in terms of decibel of arbitrary units (dB of a.u.), e.g. in case the represented signal level (e.g., amplitude or power) is represented as a normalized signal level.

In the figures, various graphs representing a signal may be illustrated. A signal may be represented in a graph in relation to its signal component, e.g. $S_{TX}$ for a signal at the transmitter side, e.g. an emitted signal or transmitted signal, or $S_{RX}$ for a signal at the receiver side, e.g. a received signal, a branched signal, or a combined signal. Noise may also be represented in a graph, e.g. individually or as part of a signal (e.g., as noise component in addition to a signal component or superimposed to a signal component), e.g. denoted as Ng for generic noise or as NTIA in case of noise associated with a transimpedance amplifier. A signal to which noise is superimposed may be represented as a noisy version of that signal without the noise. A signal including a signal component and a superimposed noise component may be denoted as $S_{TX} + N_g$ for a signal at the transmitter side, or as $S_{TX} + N_g$ for a signal at the receiver side. In case a signal is provided by the combination (e.g., the summation, or the superposition) of a plurality of other signals, it may be denoted, in addition, with the symbol Σ, to indicate that the represented signal is the combination of the plurality of other signals.

In the context of the present description, reference may be made to a LIDAR system, which may include the light detection system described herein. A LIDAR system may include various components and sensors for monitoring a scene (e.g., an environment surrounding a vehicle), as commonly known in the art. By way of example, a LIDAR system may include a brightness sensor, a presence sensor, an optical camera, a RADAR sensing system, an ultrasonic sensing system, and/or a light-based sensing system. A LIDAR system may include one or more actuators for adjusting the environmental surveillance conditions, e.g. one or more actuators for adapting the emission direction of light, for adapting the orientation of an optical camera, for adapting the emission direction of ultrasonic waves, and the like. A LIDAR system may include a data processing circuit for processing the data provided by the sensors. The data processing circuit may include, for example, a sensor fusion module for combining the data provided by different types of sensors and enhancing the monitoring of the scene. The data processing circuit may be configured to carry out object recognition and/or object classification to analyse the object(s) present in the monitored scene. The object recognition and/or object classification may be based on the data provided by the sensors (e.g., by one or more of the available sensors). A LIDAR system may include one or more memories storing information and instructions, such as the sensed data, the determined object information, instructions on how to operate the sensors, and the like. A LIDAR system may include one or more communication interfaces to communicate with other systems (e.g., other systems of a same vehicle, or another LIDAR system of another vehicle, as examples), e.g. configured for wired- and/or wireless-communication. A LIDAR system may be part, for example, of a vehicle or of a smart farming or of an indoor monitoring system.

It is understood that a LIDAR system is an example of a possible application of the adapted detection scheme described herein. The method and the light detection system described herein may also be for use in other types of application or systems in which the improved signal-to-noise ratio may be advantageous, for example in an optical transmission system (e.g., wireless or including optical fibers), e.g. in a system in which data and information may be transmitted by means of light.

In various embodiments, a light detection system may include: a detector configured to provide a received light signal; and a processing circuit configured to: provide a plurality of branched signals each being representative of the received light signal; and combine the plurality of branched signals with one another to provide a combined signal, wherein the plurality of branched signals differ from one another in such a way that, as a result of the combination, respective signal components of the plurality of branched signals combine in a constructive manner and respective noise components of the plurality of branched signals combine in an at least partially destructive manner.

In various embodiments, a light detection system may include: a detector configured to provide a received light signal; and a processing circuit configured to: provide a first branched signal and a second branched signal, the first branched signal and the second branched signal being representative of the received light signal, modify the second branched signal with respect to the first branched signal, and combine the first branched signal with the second branched signal to provide a combined signal, wherein the second branched signal is modified with respect to the first branched signal in such a way that, as a result of the combination, a first signal component of the first branched signals combines in a constructive manner with a second signal component of the second branched signal, and a first noise component of the first branched signal combines in an at least partially destructive manner with a second noise component of the second branched signal.

In various embodiments, light detection system may include: a detector configured provide a received light signal, the received light signal including a signal component and a noise component; and a processing circuit configured to: associate a plurality of delays to the received light signal to provide a plurality of branched signals each associated with a respective delay of the plurality of delays, and combine the plurality of branched signals with one another to provide, based on the respective delays, a constructive combination of the respective signal components and an at least partially destructive combination of the respective noise components.

In various embodiments, a method of detecting light may include: providing a received light signal; providing a plurality of branched signals each being representative of the received light signal; and combining the plurality of branched signals with one another to provide a combined signal, wherein the plurality of branched signals differ from one another in such a way that, as a result of the combination, respective signal components of the plurality of branched signals combine in a constructive manner and respective noise components of the plurality of branched signals combine in an at least partially destructive manner.

The expression "signal level" may be used herein to describe a parameter associated with a signal or with a portion of a signal (e.g., with a peak). A "signal level" as used herein may include at least one of a power level, a current level, a voltage level, or an amplitude level (also referred to herein as amplitude).

The expression "signal feature" may be used herein to describe a characteristic element of a signal, for example a peak, a valley, a pulse (e.g., a light pulse, a current pulse, a voltage pulse, etc.), a sequence of pulses (e.g., a sequence of light pulses, of current pulses, of voltage pulses, etc.), a plateau, and the like.

The term "amplitude" may be used herein to describe the height of a peak, e.g. the height of a pulse. The term "amplitude" may describe the signal level of the signal at the peak with respect to a reference value for the signal level. The term "amplitude" may be used herein also in relation to a signal that is not a symmetric periodic wave, e.g. also in relation to an asymmetric wave (for example in relation to a signal including periodic pulses in one direction). In this regard, the term "amplitude" may be understood to describe the amplitude of the signal (e.g., of the peak) as measured from the reference value of the signal level.

The term "processor" as used herein may be understood as any kind of technological entity that allows handling of data. The data may be handled according to one or more specific functions executed by the processor. Further, a processor as used herein may be understood as any kind of circuit, e.g., any kind of analog or digital circuit. A processor may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor or logic circuit. It is understood that any two (or more) of the processors or logic circuits detailed herein may be realized as a single entity with equivalent functionality or the like, and conversely that any single processor or logic circuit detailed herein may be realized as two (or more) separate entities with equivalent functionality or the like.

BRIEF DESCRIPTION OF THE DRAWINGS

In the drawings, like reference characters generally refer to the same parts throughout the different views. The drawings are not necessarily to scale, emphasis instead generally being placed upon illustrating the principles disclosed herein. In the following description, various aspects disclosed herein are described with reference to the following drawings, in which:

FIG. 2A shows schematically a detector and graphs associated with a received light signal according to various embodiments;

FIG. 2B shows schematically a delay stage according to various embodiments;

DETAILED DESCRIPTION OF ILLUSTRATIVE EMBODIMENTS

The following detailed description refers to the accompanying drawings that show, by way of illustration, specific details and implementations in which the aspects disclosed herein may be practiced. These aspects are described in sufficient detail to enable those skilled in the art to practice the disclosed implementations. Other aspects may be utilized and structural, logical, and electrical changes may be made without departing from the scope of the disclosed implementations. The various aspects are not necessarily mutually exclusive, as some aspects may be combined with one or more other aspects to form new aspects. Various aspects are described in connection with methods and various aspects are described in connection with devices (e.g., a light detection system, a processing circuit, a detector, etc.). However, it is understood that aspects described in connection with methods may similarly apply to the devices, and vice versa.

Figure 1:
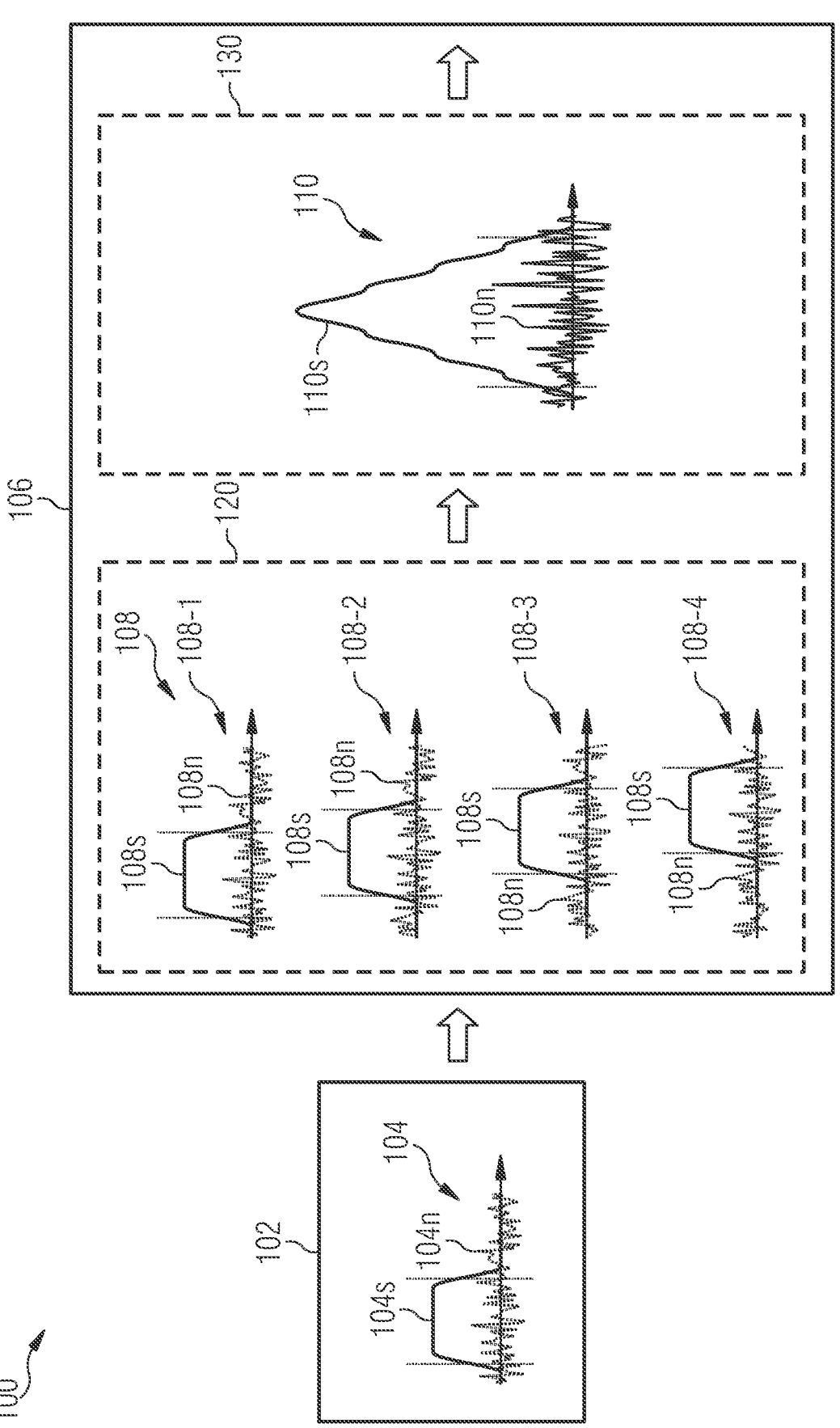
FIG. 1 shows schematically a light detection system according to various embodiments.

FIG. 1 shows a schematic diagram of a light detection system 100 according to various aspects. In some aspects, a LIDAR system may include one or more light detection systems 100.

The light detection system 100 may include a detector 102 configured to provide a received light signal 104. The detector 102 may be configured to receive a light signal and to provide an analog representation of the light signal received at the detector 102. In some aspects, providing a received light signal 104 may be understood as detecting a light signal and providing a representation of the detected light signal. As an example, the detector 102 may be configured to provide an analog signal (e.g., a current or a voltage) associated with the light signal received at the detector 102, e.g. an analog signal representing the light signal received at the detector 102 (e.g., in some aspects, the received light signal 104 may be understood as a current signal or voltage signal representing a light signal received at the detector 102). In some aspects, a received light signal 104 may be provided as a representation that may be processed by a processing circuit 106, as described in further detail below. A received light signal (e.g., the received light signal 104) may also be referred to herein as detected light signal.

The received light signal 104 may include a signal component 104s and a noise component 104n. The signal component 104s may include one or more portions of the received light signal 104 associated with a desired operation, e.g. ranging, data communication, channel estimation, as examples. The noise component 104n may be superimposed onto the signal component 104s, e.g. the signal component 104s may be a noisy version of an originally emitted signal component, as described in further detail below. In some aspects, a noise component may be present during detection of a signal. Illustratively, upon providing a received light signal (e.g., the received light signal 104), a noise component (e.g., the noise component 104n) may be present in the measurement. The noise component 104n may be understood as a noise component associated with the received light signal 104, illustratively with the propagation and/or detection of the received light signal 104.

In some aspects the received light signal 104 (e.g., the signal component 104s) may include one or more signal features, for example one or more peaks or one or more valleys. For example, a light signal may include one or more light pulses, each associated with a respective peak of one or more peaks. The one or more light pulses may provide a desired operation associated with the light signal (see also FIG. 6A to FIG. 6D). As an example, the one or more light pulses may form a sequence configured to encode data therein (e.g., a light pulse in the sequence may be seen as a "logic 1", and the absence of a light pulse in the sequence may be seen as a "logic 0"). As another example, at least one light pulse may be used for ranging, e.g. for measuring a distance to an object that reflected the light pulse back towards the detector 102. The received light signal 104 may include one or more signal features being associated with (e.g., representing) the one or more signal features of a light signal impinging onto the detector 102 (e.g., the received light signal 104 may include one or more voltage peaks, or one or more current peaks, as examples). In the exemplary representation in FIG. 1, the received light signal 104 may include one (long) pulse, it is however understood that the received light signal 104 may include any suitable number of pulses for a desired operation (e.g., may be a multi-pulse signal), e.g. two, three, four, five, or more than five, as other examples.

The detection system 100 may include a processing circuit 106, configured to process the received light signal 104. The detector 102 and the processing circuit 106 may be connected with one another, and the detector 102 may be configured to provide (e.g., transmit or communicate) the received light signal 104 to the processing circuit 106.

The processing circuit 106 may be configured to provide (e.g., to generate) a plurality of branched signals 108. In the exemplary scenario illustrated in FIG. 1, the plurality of branched signals 108 may include a first branched signal 108-1, a second branched signal 108-2, a third branched signal 108-3, and a fourth branched signal 108-4. It is however understood that the plurality of branched signals 108 may include any suitable number of branched signals, e.g. two, three, four, five, ten, or more than ten, for example.

Figure 2B:
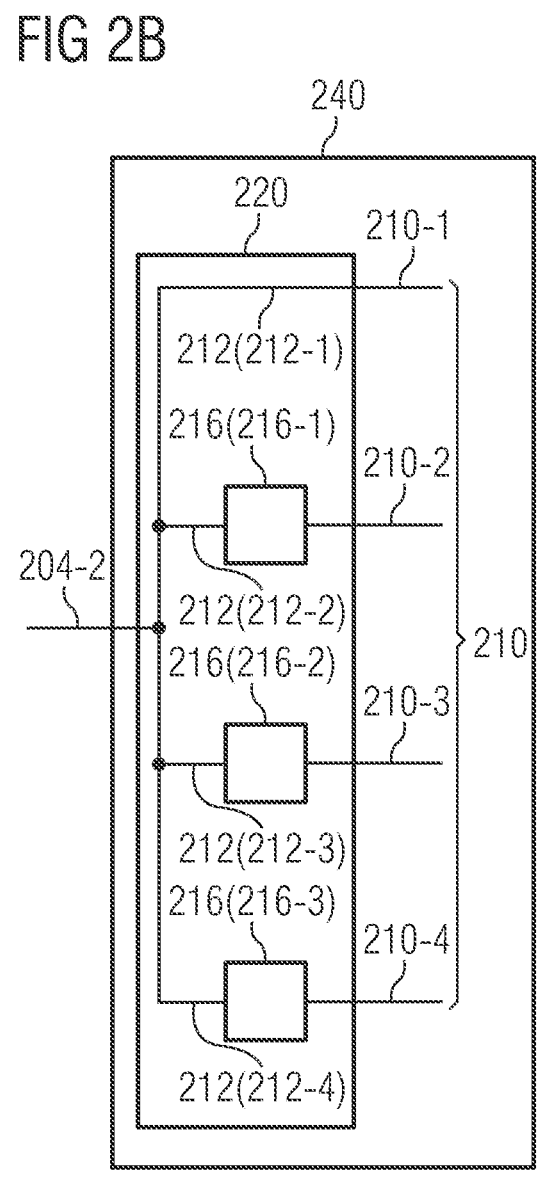

The processing circuit 106 may be configured to distribute the received light signal 104 provided by the detector 102 over a plurality of processing paths, each associated with a respective branched signal 108 (see also FIG. 2B). As an example, in case the received light signal 104 provided by the detector 102 is or includes a voltage signal, the processing circuit 106 may be configured to provide that same voltage signal to each processing path.

A branched signal 108 may be representative of the received light signal 104. A branched signal 108 may be understood as including the same signal features as the received light signal 104, e.g. a same distribution of peaks and valleys, a same sequence of peaks, and the like. Illustratively, each branched signal 108 may include one or more respective signal features representing the one or more signal features of the received light signal 104. Each branched signal 108 may include a respective signal component 108*s* and a respective noise component 108*n* associated with (e.g., representing) the signal component 104*s* and the noise component 104*n* of the received light signal 104, respectively.

For example, a branched signal 108 may be or may include a current signal or a voltage signal representative of the light signal received at the detector 102. The current or voltage signal may include positive current or voltage values in correspondence of the portions of the light signal received at the detector having a signal level (e.g., an amplitude) greater than a threshold signal level (also referred to herein as base level), and may include negative current or voltage values in correspondence of the portions of the light signal received at the detector having a signal level less than the threshold signal level. The threshold level may include, for example, a reference current or voltage value, e.g. a background noise level (e.g., an average current or voltage value of the noise associated with the light signal received at the detector 102)

In some aspects, the processing circuit 106 may be configured to modify the plurality of branched signals 108 with respect to one another (see also FIG. 2B). In the exemplary scenario in FIG. 1, the processing circuit 106 may be configured to modify the second branched signal 108-2 with respect to the first branched signal 108-1, to modify the third branched signal 108-3 with respect to the second branched signal 108-2 (and with respect to the first branched signal 108-1), etc. The processing circuit 106 may be configured such that upon propagation along (in other words, through) the associated processing path, a branched signal 108 is modified in a unique manner with respect to the other branched signals 108. The processing circuit 106 may be configured to modify the plurality of branched signals 108 in such a way that upon re-combination of the modified branched signals 108 a constructive combination of the respective signal components 110*s*, and an at least partially destructive combination of the respective noise components 110*n* may be provided, as described in further detail below.

The processing circuit 106 may be configured to combine the plurality of branched signals 108 with one another to provide a combined signal 110 (also referred to herein as summation signal, or superposition signal). In the exemplary configuration in FIG. 1, the processing circuit 106 may be configured to combine the first branched signal 108-1 with the second branched signal 108-2, with the third branched signal 108-3, and with the fourth branched signal 108-4. Combining the branched signals 108 with one another may include superimposing or summing the branched signals 108 with one another (see also FIG. 2E). As an example, a sum of the branched signals with one another may be a weighted sum. The plurality of branched signals 108 may each have a same weighing coefficient associated therewith (e.g., a first weighing coefficient associated with the first branched signal 108-1 may be equal to a second weighing coefficient associated with the second branched signal 108-2, etc.). Alternatively, different branched signals 108 may have different weighing coefficients associated therewith, e.g. at least one branched signal 108 may have a different weighing coefficient associated therewith with respect to another branched signal 108 (e.g., the first weighing coefficient may be different from the second weighing coefficient).

A weighing coefficient may be provided to compensate an attenuation of a branched signal 108. As an example, e.g. considering a time-shifting of a branched signal 108 provided by means of a passive delay-line, the branched signal 108 may experience an attenuation associated with its time-shift (a signal that is more delayed may be more attenuated). The weighing coefficient associated with the attenuated signal may compensate for the attenuation, e.g. the weighing coefficient may be greater than a weighing coefficient associated with a non-attenuated signal.

As another example, the weighing coefficients may provide a dynamic adaptation of the modification and combination of the branched signals (e.g., during runtime). Illustratively, a weighing coefficient may be switched from 0 to 1, or vice versa, to exclude a branched signal from the combination, or to include a branched signal in the combination.

The plurality of branched signals 108 may differ from one another in such a way that, as a result of the combination, respective signal components 108*s* of the plurality of branched signals 108 combine in a constructive manner and respective noise components 108*n* of the plurality of branched signals 108 combine in an at least partially destructive manner. In the exemplary configuration in FIG. 1, the second branched signal 108-2 may be modified with respect to the first branched signal 108-1 in such a way that a first signal component of the first branched signals 108-1 combines in a constructive manner with a second signal component of the second branched signal 108-2, and a first noise component of the first branched signal 108-1 combines in an at least partially destructive manner with a second noise component of the second branched signal 108-2. The third branched signal 108-3 may be modified with respect to the second branched signal 108-2 and the first branched signal 108-1 in such a way that a third signal component of the third branched signals 108-3 combines in a constructive manner with the second signal component of the second branched signal 108-2 and with the first signal component of the first branched signal 108-1, and a third noise component of the third branched signal 108-3 combines in an at least partially destructive manner with the second noise component of the second branched signal 108-2 and with the first noise component of the first branched signal 108-1, etc.

As an example (see also FIG. 2B), the processing circuit 106 may be configured to time-shift the plurality of branched signals 108 with respect to one another, and the time-shift(s) may be configured such that the as a result of the combination, respective signal components 108*s* of the plurality of branched signals 108 combine in a constructive manner and respective noise components 108*n* of the plurality of branched signals 108 combine in an at least partially destructive manner. As an example, the time-shift between two branched signals 108 may be selected such that the two branched signals 108 (illustratively, the respective signal features) have an at least partial overlap in time (see also FIG. 2B).

The enhancement of the signal component 110*s* of the combined signal 110 with respect to its noise component 110*n* may be described as follows for the case in which the modification of the branched signals 108 includes time-shifting the branched signals 108 with respect to one another (e.g., with respect to a non-delayed branched signal used as reference). For example, in case of a summation of the branched signals 108, and assuming that the signal components 108s are positive (e.g., have a positive amplitude) the respective signal components 108s may sum up constructively. Denoting for example as "a" (with a≥0) the signal component of a first branched signal, and as "b" (with b≥0) the signal component of a second branched signal, the sum may correspond to |a|+|b| (where the operator |x| denotes the magnitude of a number x). The noise components of the first branched signal and the second branched signal being summed may be either positive or negative (e.g., the noise may randomly fluctuate around a base level). For example, the noise component 108n of the first branched signal may be positive (e.g., denoted as "c", with c≥0) and the noise component 108n of the second branched signal may be negative (e.g., denoted as "d", with d<0). In this case, the sum corresponds to |c|−|d|, thus providing a result (a combined noise component) that at least partially cancels out.

A noise component or signal component being positive may be understood as a portion of the respective signal having a positive voltage or a positive current associated therewith (e.g., with respect to a reference voltage value or current value). A noise component or signal component being negative may be understood as a portion of the respective signal having a negative voltage or a negative current associated therewith (e.g., with respect to the reference voltage value or current value). As an example, in case the detector includes an avalanche photo diode, the output of the avalanche photo diode may be coupled with a capacitor, providing an AC-coupling, whose output may assume positive or negative (current or voltage) values.

Stated in a different fashion, the time-shift(s) may be selected in such a way that the signal components 108s always sum up in a constructive manner, e.g. the respective amplitudes overlap such that the combined amplitude is greater with respect to the individual amplitudes. This may be the case, for example, for a light signal received at the detector 102 including one or more light pulses having positive amplitude. Any time-shift that provides an at least partial overlap of a pulse of a branched signal with another pulse of another branched signal provides the desired constructive combination (at the overlapping portion). The noise components 108n may sum up both in a constructive manner and in a destructive manner, e.g. the respective amplitudes may overlap such that the combined noise amplitude is for certain portions greater than the individual noise amplitudes and for certain portions less than the individual noise amplitudes (depending on whether the summed noise components are both positives in the overlapping portion, both negatives, or one positive and one negative). The overall result provides that the signal component 110s of the combined signal 110 is enhanced more than its noise component 110n, thus increasing the signal-to-noise ratio.

A signal component 110s of the combined signal 110 may include a constructive combination of the respective signal components 108s of the plurality of branched signals 108. A noise component 110n of the combined signal 110 may include an at least partially destructive combination of the respective noise components 108n of the plurality of branched signals 108. Illustratively, the signal component 110s of the combined signal 110 may be greater than the signal component 104s of the received light signal 104 by a first factor, and the noise component 110n of the combined signal 110 may be greater than the noise component 104n of the received light signal 104 by a second factor less than the first factor (see also FIG. 2E).

The processing as described herein may provide that a signal-to-noise ratio associated with the received light signal 104 is improved in view of the increased signal component 110s of the combined signal 110 with respect to its noise component 110n.

In some aspects, the processing circuit 106 may be configured to detect the signal component 110s of the combined signal 110, e.g. may be configured to extract the signal component 110s of the combined signal 110 for further processing. As an example, the processing circuit 106 may be configured to generate a trigger signal to stop a time-of-flight measurement associated with the received light signal 104 by using the detected signal component 110s. The time-of-flight associated with the received light signal 104 may describe a time elapsed from the emission of the light signal and the reception of the light signal (e.g., at the detector 102). As another example, the processing circuit 106 may be configured to decode data encoded in the detected signal component 110s (e.g., the processing circuit 106 may include one or more processors configured to decode the encoded data).

For the purpose of explanation, the processing circuit 106 may include (may be divided into) a modification stage 120, and a combination stage 130, to carry out the processing of the received light signal 104. It is however understood that the various functions described herein are not necessarily performed in separate stages, or in stages separated as exemplarily illustrated herein. The function or functions described herein in relation to a "stage" of a processing circuit may be understood to be carried out by the processing circuit.

The operation of a light detection system (e.g., of a detector and processing circuit) will be described in further detail with reference to FIG. 2A to FIG. 2E that show various aspects of the processing of a signal (e.g., of the received light signal 104). In the FIG. 2A to FIG. 2E reference may be made to a modification of branched signals including delaying the branched signals with respect to one another. It is understood that the delaying is only an example, and other types of modification may be provided, as described above.

FIG. 2A shows a detector 202 and graphs 200a-1, 200a-2 associated with a light signal 204-1, 204-2 according to various aspects. The detector 202 may be an exemplary implementation of the detector 102, and the light signal 204-2 may be an example of the received light signal 104, described in relation to FIG. 1. The graph 204a-1 may illustrate a light signal 204-1 without any noise superimposed to it, e.g. a light signal 204-1 emitted or to be emitted, $S_{TX}$, (e.g., by a light emission system of a LIDAR system). The graph 200a-2 may illustrate an exemplary light signal 204-2 received or detected (e.g., at a light detection system 100) and which may be processed by a processing circuit, e.g. by the processing circuit 106 described in relation to FIG. 1. The graphs 200a-1, 200a-2 may include a time in the horizontal axis (in nanoseconds) and a power in the vertical axis (in dB of a.u.). It is understood that the representation in the graphs 200a-1, 200a-2 could be provided in terms of any suitable parameter associated with the signal (e.g., with its signal level), such as a power, current, amplitude, or voltage. In the graph 200a-2, the received light signal 204-2 is illustrated in terms of signal component ($S_{RX}$), noise component ($N_g$), and signal component with superimposed noise component ($S_{RX}+N_g$). An average signal level of the noise (a noise mean) is also represented in the graph 200a-2, e.g. −60.30 dB only as a numerical example.

The detector 202 may be configured to receive a light signal (e.g., the light signal 204-1) and provide a received signal 204-2 representing the signal received at the detector 202. The light signal 204-2 may include a noise component superimposed to the signal component. Illustratively, the received light signal 204-2 may be a noisy version of the emitted light signal 204-1. In the exemplary configuration shown in FIG. 2A, the emitted light signal 204-1 may include a pulse 205 having a relatively long duration (e.g., 50 ns as a numerical example). The received light signal 204-2 may include a pulse 207 being a "noisy" version of the pulse 205 of the emitted light signal 204-1. In this exemplary configuration, the received light signal 204-2 may have a signal-to noise-ratio of about 10 dB associated therewith (as indicated by the arrow 209 in graph 200*a*-2, showing a difference between the signal level of the pulse 207 and the average signal level of the noise).

The detector 202 may include a sensing element 206 (or a plurality of sensing elements) sensitive for the light signal to be detected. The sensing element 206 may be configured to generate a response signal upon the light signal impinging onto the sensing element 206. The response signal may include a (first) analog signal of a first type, e.g., a current. The response signal may be proportional to the light signal sensed by the sensing element 206 (and may follow the behavior of the sensed signal). In some aspects, the detector 202 may include a plurality of sensing elements 206 (e.g., of the same type or of different types). In this configuration, the plurality of sensing elements 206 may form an array, e.g. a one-dimensional or two-dimensional array. Illustratively, the sensing elements 206 may be disposed along one direction (e.g., a vertical direction or a horizontal direction), or may disposed along two directions, e.g. a first (e.g., horizontal) direction and a second (e.g., vertical) direction.

In some aspects, the detector 202 (e.g., the sensing element 206) may include at least one photo diode. The detector may be understood in this case as a photo detector that detects an optical signal and converts it into an analog signal (e.g., into an electrical current signal). The at least one photo diode may be configured to generate an analog signal (e.g., a photo current) in response to a light signal impinging onto the at least one photo diode. As examples, the photo diode may include at least one of a PIN photo diode, an avalanche photo diode (APD), a single photo avalanche diode, or a silicon photomultiplier.

The detector 202 may include at least one amplifier circuit 208 configured to amplify the response signal generated by the sensing element 206 (e.g., the response signal generated by the at least one photo diode). The amplifier circuit 208 may be coupled with the sensing element 206, and may be configured to receive the (first) analog signal provided by the sensing element 206. The amplifier circuit 208 may be configured to amplify the received analog signal. The amplifier circuit 208 may be configured to provide a (second) analog signal by amplifying the received (first) analog signal.

In some aspects, the amplifier circuit 208 may be configured to change a type of the received analog signal, e.g. from a current to a voltage or vice versa. Illustratively, the amplifier circuit 208 may be configured to provide a second analog signal of a second type based on the received first analog signal of a first type. The amplifier circuit 208 may include a current amplifier, a voltage amplifier or a transimpedance amplifier. Considering, for example, the case in which the sensing element 206 includes one or more photo diodes (e.g., PIN or APD) the input signal to the amplifier circuit 208 may be a current signal, and the amplifier circuit 208 may include a transimpedance amplifier (TIA) to amplify and convert the signal into a voltage signal.

The sensing element 206 and the amplifier circuit 208 may provide a received light signal 204-2 at an output of the detector 202 (e.g., at an output coupled with a processing circuit, e.g. with the processing circuit 106), illustratively an analog (and amplified) representation of a light signal sensed by the sensing element 206.

In FIG. 2B to FIG. 2E various components of a processing circuit 240 are described. The processing circuit 240 (and its components) may be an exemplary implementation of the processing circuit 106 described in relation to FIG. 1.

Figure 2C:
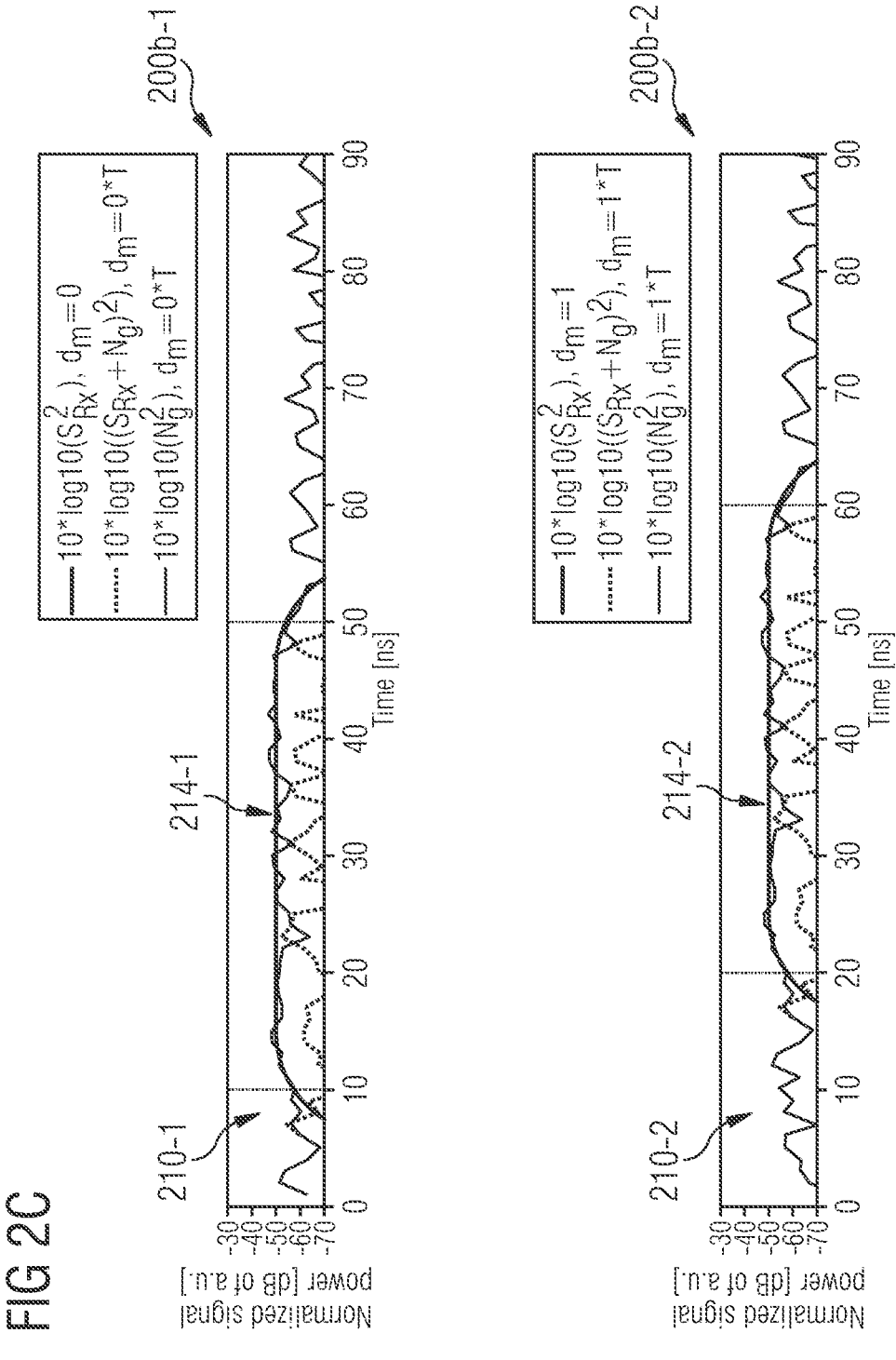
FIG. 2C and FIG. 2D each shows graphs associated with branched signals according to various embodiments.
Figure 2D:
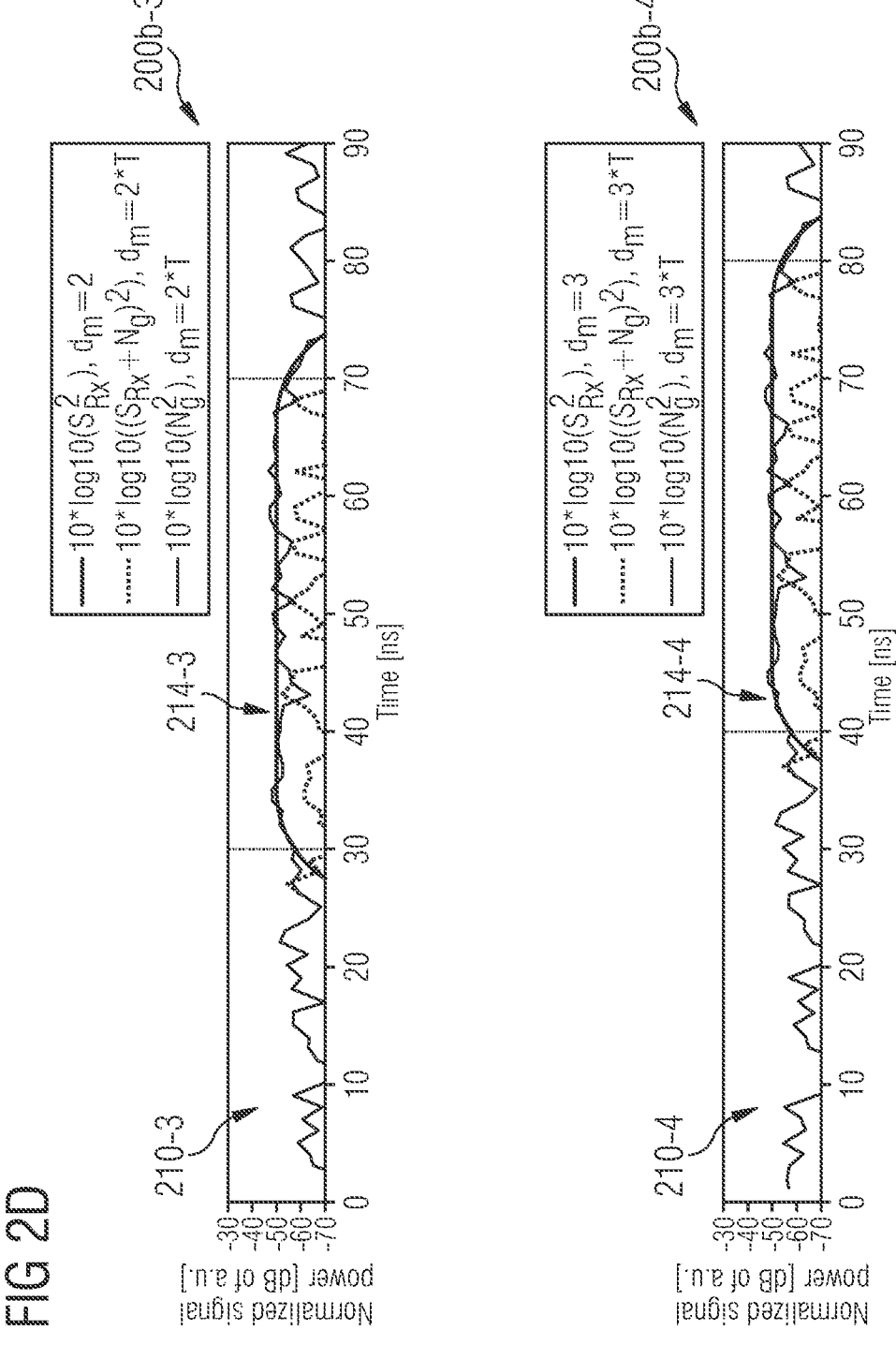

FIG. 2B, FIG. 2C, and FIG. 2D show a modification stage 220 and various graphs 200*b*-1, 200*b*-2, 200*b*-3, 200*b*-4 associated with a plurality of branched signals 210 representing the received light signal 204-2. The graphs 200*b*-1, 200*b*-2, 200*b*-3, 200*b*-4 may include a time in the horizontal axis (in nanoseconds) and a power in the vertical axis (in dB of a.u.). The plurality of branched signals 210 may be an example of the plurality of branched signals 108 described in relation to FIG. 1. The modification stage 220 may be an exemplary component of a processing circuit (e.g., of the processing circuit 106, 240) Illustratively, the modification stage 220 may be an exemplary configuration of the modification stage 120 described in relation to FIG. 1. In the following, the modification stage 220 may also be referred to as delay stage 220. The delay stage 220 may be configured to receive the received light signal 204-1 and to output the plurality of branched signals 210. In the graphs 200*b*-1, 200*b*-2, 200*b*-3, 200*b*-4, a branched signal is illustrated in terms of signal component ($S_{RX}$), noise component (Ng), and signal component with superimposed noise component ($S_{RX}+N_g$).

The processing circuit 240 (e.g., the delay stage 220) may be configured to distribute the received light signal 204-2 over a plurality of processing paths (e.g., first to fourth processing paths 212-1, 212-2, 212-3, 212-4 in the exemplary configuration in FIG. 2B, collectively referred to as processing paths 212) Each processing path 212 may be associated with a respective branched signal 210 e.g., first to fourth branched signals

210-1, 210-2, 210-3, 210-4 in the exemplary configuration in FIG. 2B, collectively referred to as branched signals 210). Illustratively, each processing path 212 may provide as output the respective branched signal 210 (the respectively modified version of the received light signal 204-2).

In the configuration shown in FIG. 2B, the plurality of branched signals 210 may be delayed with respect to one another. Modifying a branched signal 210 (along the respective processing path 212) may include time-shifting the branched signal 210 with respect to the other branched signals 210 (e.g., with respect to one of the branched signals 210 used as a reference for time-shifting the others, e.g. with respect to the first branched signal 210-1). Modifying the second branched signal 210-2 with respect to the first branched signal 210-1 may include delaying the second branched signal 210-2 with respect to the first branched signal 210-1, modifying the third branched signal 210-3 with respect to the first branched signal 210-1 may include delaying the third branched signal 210-3 with respect to the first branched signal 210-1, etc. The delay between different branched signals 210 may be such that, as a result of the (subsequent) combination, the signal components of the branched signals 210 combine constructively and the noise components of the branched signals 210 combine at least partially destructively, as described in relation to FIG. 1. In some aspects, a delay between different branched signals 210 may be understood as a delay between branched signals 210 associated with adjacent processing paths 212, e.g. a (first) delay between the first branched signal 210-1 and the second branched signal 210-2, a (second) delay between the second branched signal 210-2 and the third branched signal 210-3, etc. In some aspects, a delay between different branched signals 210 may be understood as a delay between a branched signal 210 and the reference branched signal, e.g. a (first) delay between the first branched signal 210-1 and the second branched signal 210-2, a (second) delay between the first branched signal 210-1 and the third branched signal 210-3, etc.

Providing the plurality of branched signals 210 may include delaying the received light signal 204-2 by one or more predefined delays. A respective delay (or no delay) may be imposed onto the received light signal 204-2 along each processing path 212. As shown in the graphs 200b-1, 200b-2, 200b-3, 200b-4 upon imposing the delay(s), the one or more signal features of a branched signal 210 may be time-shifted with respect to the one or more signal features of another branched signal 210. Taking as a reference the first branched signal 210-1 shown in the first graph 200b-1 (which may be a non-delayed representation of the received light signal 204-2), the pulse 214-1 present in the first branched signal 210-1 may be time-shifted in the other branched signals 210-2, 210-3, 210-4. The pulse 214-2 in the second branched signal 210-2 shown in the second graph 200b-2 may be delayed with respect to the first branched signal 210-1, e.g. may occur or appear at a later time point with respect to the pulse 214-1 in the first branched signal 210-1. The pulse 214-3 in the third branched signal 210-3 shown in the third graph 200b-3 may be further delayed with respect to the first branched signal 210-1, e.g. may occur or appear at a further later time point with respect to the pulse 214-2 in the second branched signal 210-2, etc. The respective delays may be selected to ensure that the pulse(s) in the different branched signals 210 have at least a partial overlap to provide the constructive superposition described above (e.g., the delay may be not greater than the pulse duration itself in this case, otherwise there would be no overlap upon combination of the branched signals).

The one or more predefined delays may be associated with a duration of the received light signal 204-2, e.g. the one or more predefined delays may be selected based on a (known or expected) duration of the received light signal 204-2. In some aspects, the one or more predefined delays may be selected based on a duration of a pulse of the received light signal 204-2, and/or based on a time distance between pulses of the received light signal 204-2. Illustratively, the one or more predefined delays may be selected in accordance with the signal component of the received light signal 204-2, such that as a result of the combination the signal components of the branched signals 210 may combined with one another in a constructive manner (e.g., such that the respective signal components of the branched signals 210 may at least partially overlap with one another) The time-shifts imposed onto the received light signal 204-2 along the processing paths 212 may be such that the desired constructive combination may be provided. As a numerical example, at least one predefined delay of the one or more predefined delays may be in the range from 0.1 ns to 200 ns, for example in the range from 1 ns to 20 ns, for example may be 10 ns.

In some aspects, each predefined delay (of the one or more delays) may be associated with a respective integer multiple of a predefined delay period (T). As an example, a first delay (e.g., between the first branched signal 210-1 and the second branched signal 210-2) may be equal the predefined delay period (1*T). A second delay (e.g., between the first branched signal 210-1 and the third branched signal 210-3) may be two times the predefined delay period (2*T). A third delay (e.g., between the first branched signal 210-1 and the fourth branched signal 210-4) may be three times the predefined delay period (3*T), etc. As a numerical example, the predefined delay period may be in the range from 0.1 ns to 200 ns, for example in the range from 1 ns to 20 ns, for example may be 10 ns. In the exemplary configuration in FIG. 2B to FIG. 2D, the predefined delay period (e.g., assuming a pulse duration of about 50 ns) may be 10 ns (e.g., the first delay may be 10 ns, the second delay may be 20 ns, and the third delay may be 30 ns). In the graphs 200b-1, 200b-2, 200b-3, 200b-4, the delay may be indicated as $d_m$, e.g. as one delay of "m" possible delays, and may be 0 (0*T) for the first branched signal 210-1 in the first graph 200b-1, 1(1*T) for the second branched signal 210-2 in the second graph 200b-2, 2(2*T) for the third branched signal 210-3 in the third graph 200b-3, and 3(3*T) for the fourth branched signal 210-4 in the fourth graph 200b-4, as an example.

It is understood that the one or more delays may also be provided in a different order with respect to the one described above, e.g. the delay being three times the predefined delay period may be provided between the first branched signal 210-1 and the second branched signal 210-2, the delay being two times the predefined delay period may be provided between the first branched signal 210-1 and the fourth branched signal 210-4, and the delay being equal to the predefined delay period may be provided between the first branched signal 210-1 and the third branched signal 210-3, as another example.

In some aspects, the one or more delays may include a number of delays based on a ratio of a duration of the received light signal 204-2 to the predefined delay period. Illustratively, the number of processing paths 212 may be adapted based on the duration of the received light signal 204-2 with respect to the delay period provided by each processing path 212. In some aspects, a dynamic adaptation may be provided, e.g. the processing circuit 240 may be configured to distribute the received light signal 204-2 over a subset of all the available processing paths 212 in accordance with the duration of the received light signal 204-2, e.g. in accordance with the ratio of the duration to the predefined delay period. The dynamic adaptation of the number or delays provided may ensure that an appropriate number of branched signals 210 are provided to achieve the desired constructive combination of the respective signal components. The dynamic adaptation may also provide that a light signal having a short duration (e.g., a having a light pulse with short duration, for example less than 10 ns) is not time-shifted by a delay that is not suitable for obtaining the desired constructive superposition of the signal components (illustratively, may prevent the processing of "useless" branched signals).

In some aspects, the processing circuit 240 (e.g., the delay stage 220) may include one or more delay elements 216 each associated with a respective delay of the one or more predefined delays. In the exemplary configuration in FIG. 2B, the delay stage 220 may include a first delay element 216-1 (e.g., along the second processing path 212-2), a second delay element 216-2 (e.g., along the third processing path 212-3), and a third delay element 216-3 (e.g., along the fourth processing path 212-4). The delay stage 220 may include at least one processing path 212 for the received light signal 204-2 along which the received light signal is not modified 204-2 (e.g., not delayed in this exemplary case). In the configuration in FIG. 2B the first processing path 212-1 may not include any delay element 216 (or may include a delay element which may be controlled to impose zero delay on the received light signal 204-2). The branched signal 210 associated with processing path 212 along which the received light signal 204-2 is not modified may be provided as reference for modifying the other branched signals 210. It is understood that this configuration is exemplary, and other configurations may be provided, e.g. a configuration in which each processing path 212 includes a respective delay element 216 or a configuration in which more than one processing path 212 does not include a delay element 216. The distribution of the received light signal 204-2 may be understood as the processing circuit being configured to distribute the received light signal 214-2 to each delay element of the one or more delay elements 216.

The number of delay elements 216 may be adapted in accordance with the number of delays to be provided to the received light signal 204-2. In some aspects, the number of delay elements 216 may be equal to the number of processing paths 212, alternatively may be equal to the number of processing paths 212 minus 1 (e.g., in case a non-delayed signal is used as reference). As a numerical example, the one or more delay elements may include a number of delay elements in the range from 1 to 16, for example in the range from 1 to 8, for example in the range from 2 to 4.

Possible implementations of the delay stage 220 and the delay elements 216 will be described in further detail in relation to FIG. 5A to FIG. 5C.

Figure 2E:
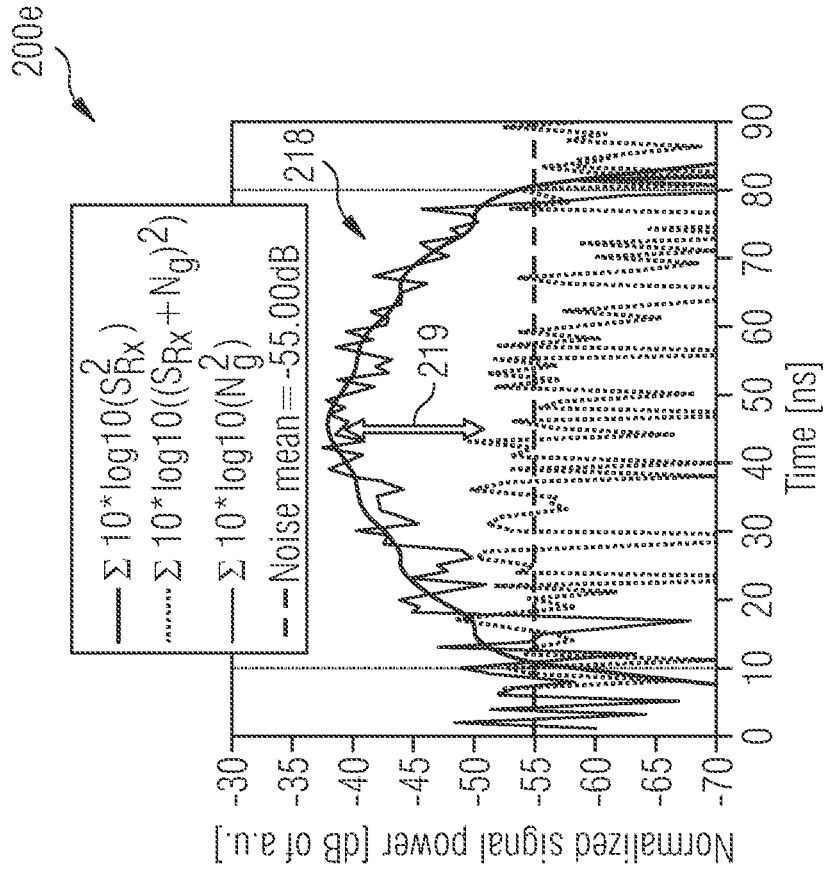
FIG. 2E shows schematically a summation stage and a graph associated with a combined signal according to various embodiments.
Figure 2E:
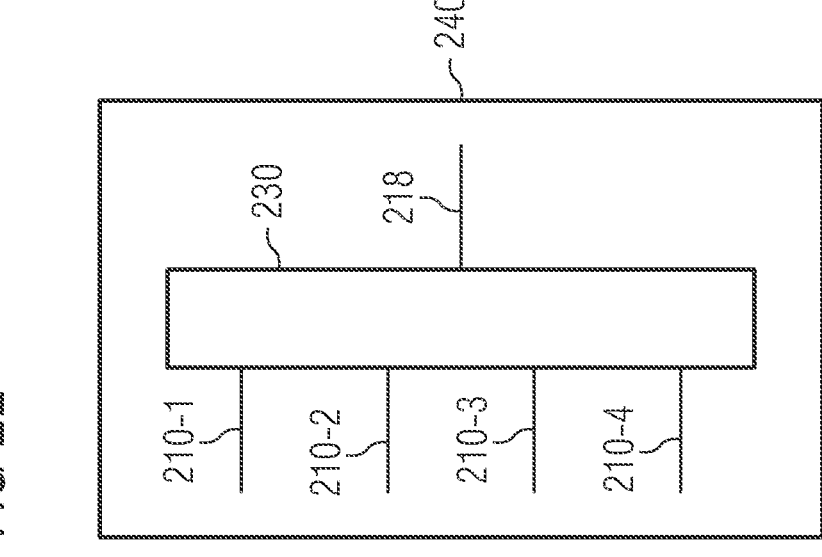

FIG. 2E shows a combination stage 230 and a graph 200$e$ associated with a combined signal 218. The combined signal may be an example of the combined signal 110 described in relation to FIG. 1. The graphs 200$c$ may include a time in the horizontal axis (in nanoseconds) and a power in the vertical axis (in dB of a.u.). The combination stage 230 may be an exemplary component of a processing circuit (e.g., of the processing circuit 106, 240). Illustratively, the combination stage 230 may be an exemplary configuration of the combination stage 130 described in relation to FIG. 1. In the following, the combination stage 230 may also be referred to as summation stage 230. The summation stage 230 may be configured to the plurality of branched signals 210, and may be configured to output the combined signal 218. In the graph 200$e$, the combined signal is illustrated in terms of signal component ($S_{RX}$), noise component ($N_g$), and signal component with superimposed noise component ($S_{RX}+N_g$). An average signal level of the noise (a noise mean) is also represented in the graph 200$e$, e.g. −55.00 dB only as a numerical example.

The summation stage 230 may be configured to combine together the plurality of branched signals 210 to provide the combined signal 218. The combination may provide that the combined signal 218 has a greater signal-to-noise ratio associated therewith with respect to the received light signal 204-2. In the exemplary configuration shown in FIG. 2E, the combined signal 218 may have a signal-to-noise ratio of about 16 dB associated therewith (as indicated by the arrow 219 in graph 200$e$, showing a difference between the signal level of the pulse of the combined light signal 218 and the signal level of the noise)

The summation stage 230 may include any component configured to combine (e.g., to sum) a plurality of signals with one another. As an example, the summation stage 230 may include a transistor or an amplifier. As another example, the summation stage 230 may include a passive network, e.g. configured to provide a summation of currents. The passive network may include, for example, one or more resistors (a resistor network) and/or one or more transformers.

The processing shown in FIG. 2A to FIG. 2E may be illustratively described as follows. The measured signal after the transimpedance amplifier (e.g., the received light signal 204-2 downstream the amplifier circuit 208), which is noisy, is split into several branches, e.g. M branches (M processing paths 212) The signal at each branch may be delayed (e.g., at the delay stage 220) by a multiple of a time increment T (e.g., of a predefined time period), e.g. for a configuration with M branches the chosen delays $d_m$ may be chosen to be 0*T, 1*T, . . . , (M−1)*T, for example. The delayed components are summed-up with equal (or non-equal) weight (e.g., at the summation stage 230) The measured and delayed components of the intended signal always sum-up constructively, e.g. two signals with an amplitude of 1 sum-up to an amplitude of 2. The measured and delayed noise components or generic noise sums-up both constructively and negatively, e.g. two noise signals with an average amplitude of 1 sum-up to an average amplitude of sqrt(2) =1.41. These different factors provided by the sum-up provide the desired increase in the signal-to-noise ratio. As a further processing step, a trigger or pulse detector may operate on the summed-up signal (e.g., on the combined signal 218).

By way of illustration, the system setup may be understood as an analog-to-digital conversion (ADC)-based system with oversampling of factor M and signal averaging over M samples. However, the approach described herein may be fully implemented in the analog domain (not requiring sampling and analog-to-digital converters) and therefore is suitable for time-to-digital conversion (TDC)-detection schemes.

Possible implementations of a light detection system (e.g., of the light detection system 100) will be described in further detail in relation to FIG. 3A to FIG. 4D.

FIG. 3A, FIG. 3B, FIG. 3C, FIG. 3D, and FIG. 3E each shows schematically a respective light detection system 300$a$, 300$b$, 300$c$, 300$d$, 300$e$ according to various aspects. These light detection systems 300$a$, 300$b$, 300$c$, 300$d$, 300$e$ may be an exemplary implementation of the light detection system 100 described in FIG. 1.

The light detection system 300$a$, 300$b$, 300$c$, 300$d$, 300$e$ may include a detector 302 (e.g., configured as the detector 102, 202 described in relation to FIG. 1 and FIG. 2A) including a sensing element 304 and an amplifier circuit 306 (e.g., configured as the sensing element 206 and the amplifier circuit 208 described in relation to FIG. 2A, for example a photo diode and a transimpedance amplifier, respectively).

The light detection system 300$a$, 300$b$, 300$c$, 300$d$, 300$e$ may include a processing circuit 340$a$, 340$b$, 340$c$, 340$d$, 340$e$ including a delay stage 320$a$, 320$b$, 320$c$, 320$d$, 320$d$ and a summation stage 330$a$, 330$b$, 330$c$, 330$d$, 330$e$ (e.g., configured, respectively, as the processing circuit 106, 240, the modification stage 120, 220 and the combination stage 130, 230 described in relation to FIG. 1, FIG. 2B, and FIG. 2E).

The light detection system 300$a$, 300$b$, 300$c$, 300$d$, 300$e$ (e.g., the processing circuit 340$a$, 340$b$, 340$c$, 340$d$, 340$e$) may include a trigger circuit 310 configured to generate a trigger signal based on the combined signal provided by the summation stage 330$a$, 330$b$, 330$c$, 330$d$, 330$e$, e.g. to stop a time-of-flight measurement associated with a light signal received at the detector 302. As an example, the trigger circuit 310 may include a Schmitt-Trigger.

In some aspects, a light detection system 300a, 300b, 300c, 300d, 300e may include a driver 308 disposed between the detector 302 and the processing circuit 340a, 340b, 340c, 340d, 340e. The driver 308 may be configured to provide impedance matching between the detector 302 and the processing circuit 340a, 340b, 340c, 340d, 340e (between the output of the detector and the input of the processing circuit). A transimpedance amplifier 306 may have high output impedance. Loading a transimpedance amplifier 306 with any low impedance at its output (e.g. the input impedances of the following stages) would result in a low amplitude. This may undo the amplification provided by the transimpedance amplifier and may deteriorate the performance of the light detection system 300a, 300b, 300c, 300d, 300e. The driver 308 may provide impedance matching. In some aspects, the driver 308 may have an amplification of 1, with high input impedance and low output impedance.

The driver 308 may include an input coupled with the detector 302 and an output coupled with the processing circuit 340a, 340b, 340c, 340d, 340e. The input may have an input impedance associated therewith and the output may have an output impedance associated therewith. The input impedance may be greater than the output impedance (e.g., at least two times greater, or at least five times greater, or at least ten times greater).

As an exemplary implementation, the driver 308 may include a transformer (an impedance-matching transformer). The input of the transformer may include a first (e.g., primary) winding having a first number of turns, and the output of the transformer may include one or more second (e.g., secondary) windings each having a respective second number of turns. For example, the transformer may include a second winding for each processing path 312. The first number of turns may be greater than the second number of turns (e.g., at least two times greater, or at least five times greater, or at least ten times greater). This may provide matching the low output impedance of the driver 308 with the high input impedance of the delay stage.

As another exemplary implementation, the driver 308 may include a passive network. The passive network may include at least one inductance and one capacitance (e.g., at least one component having an impedance associated therewith and at least one component having a capacitance associated therewith). The impedance and the capacitance may be adapted to provide the desired impedance matching. In some aspects, the passive network may be realized by means of a printed circuit board design. Without the impedance matching at the input of the delay stage 320a, 320b, 320c, 320d, 320e reflections may occur with consequent signal distortion.

The driver 308 may be a low noise driver. In case the driver 308 was noisy (see FIG. 3A), the noise may degrade the overall performance of the light detection system 300a. The graphs 350-1, 350-2, 350-3 show the processing of a light signal at various stages in the presence of a noisy driver 308. The graphs 350-1, 350-2, 350-3 may include a time in the horizontal axis (in nanoseconds) and a power in the vertical axis (in dB of a.u.). The graph 350-1 shows a received light signal 352 as provided by the detector 302 (e.g., downstream of the transimpedance amplifier 306). The received light signal 352 may be noisy, e.g. with a signal-to-noise ratio of about 10 dB in this exemplary case as indicated by the arrow 353. The graph 350-2 shows the received light signal 354 downstream of the noisy driver 308, with a signal-to-noise ratio of about 8.2 dB in this exemplary case (noisier than the signal downstream of the transimpedance amplifier 306), as indicated by the arrow 355. The graph 350-3 shows the combined signal 356 downstream of the summation stage 330a, which may have an improved signal-to-noise ratio (e.g., about 14.3 dB), as indicated by the arrow 357, but with a reduced improvement with respect to what could be achieved, due to the noise introduced by the driver 308.

In the graphs 350-1, 350-2, 350-3 the received signal and the combined signal are illustrated in terms of signal component ($S_{RX}$), noise component (Ng), and signal component with superimposed noise component ($S_{RX}+N_g$). An average signal level of the noise (a noise mean) is also represented in the graphs 350-1, 350-2, 350-3, e.g. −60.03 dB in the graph 350-1, −58.30 dB in the graph 350-2, and −53.12 dB in the graph 350-3 only as numerical examples.

As shown in FIG. 3B to FIG. 3E, the driver 308 may be selected to be a low noise driver, to provide the impedance matching without deteriorating the enhancement provided by the delay stage and the summation stage in a way that would limit the capabilities of the detection scheme. The driver 308 may be illustratively configured to provide high input impedance, low output impedance (matched to delay stage input impedance), and low noise. In some aspects, the dynamic range and the frequency range of the driver 308 may be adapted based on the light signal to be detected. In some aspects, the characteristic of the driver 308 may have linearity.

Figure 3A:
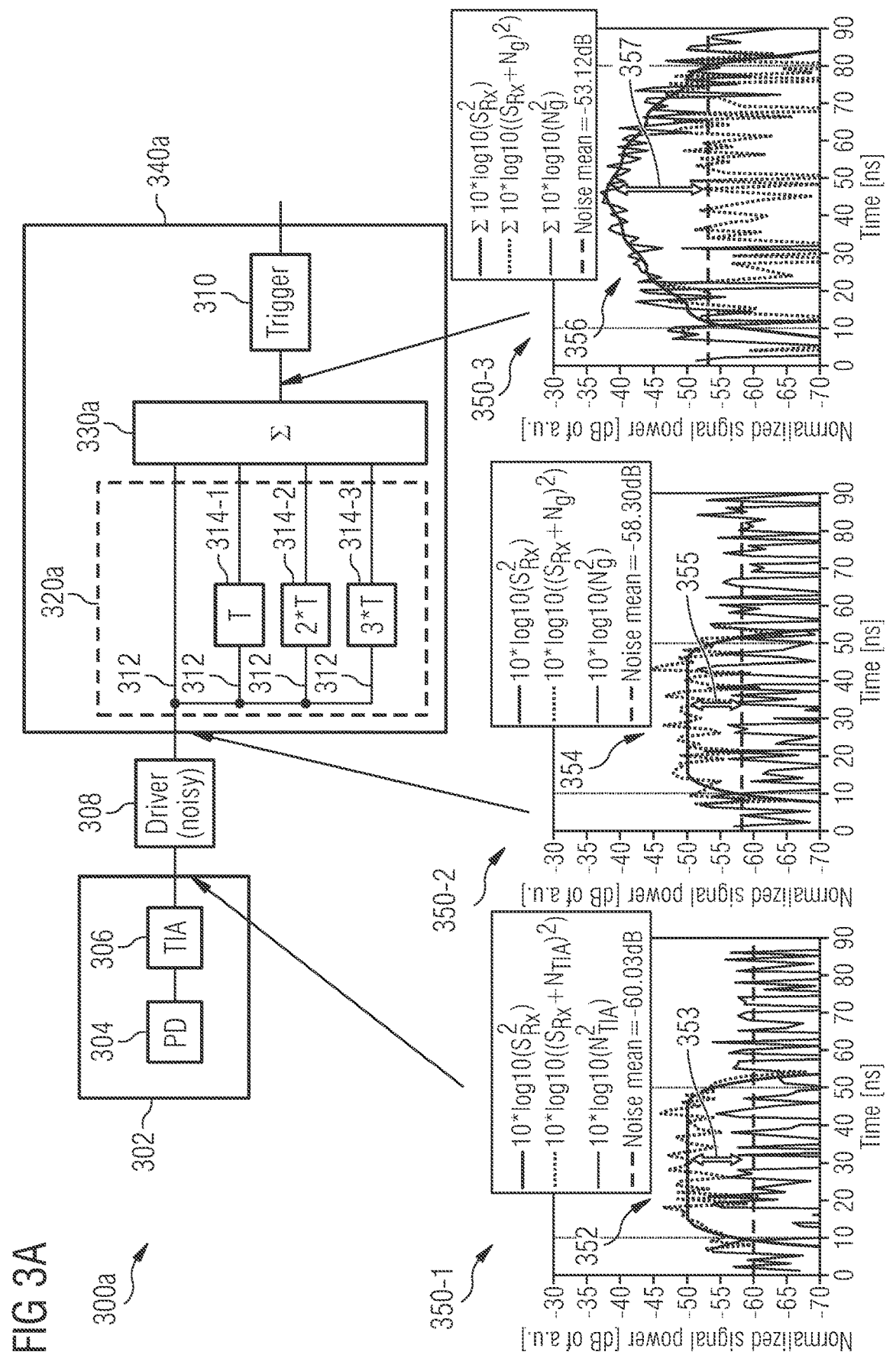
FIG. 3A to FIG. 3E each shows schematically a light detection system according to various embodiments.
Figure 3B:
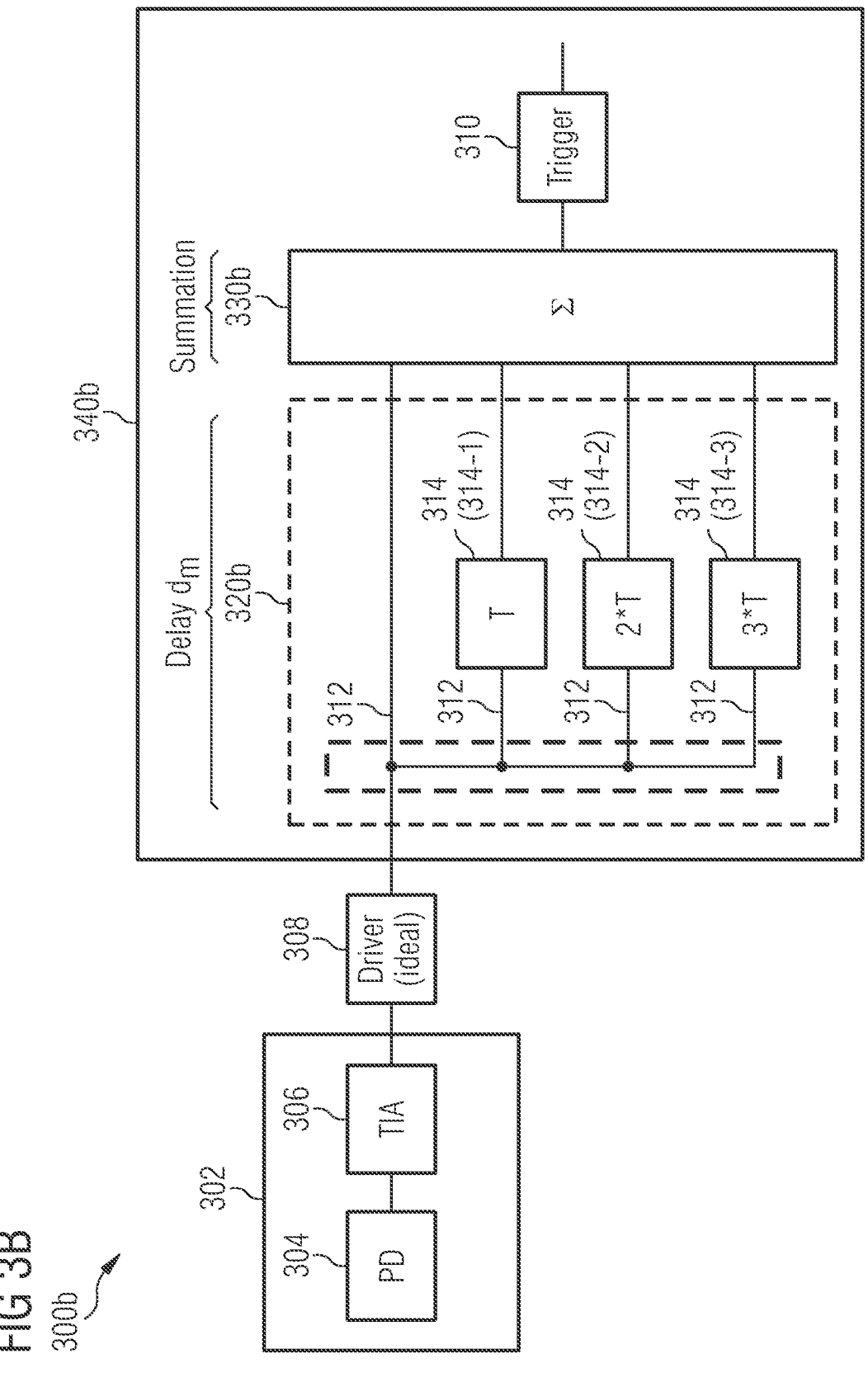
Figure 3C:
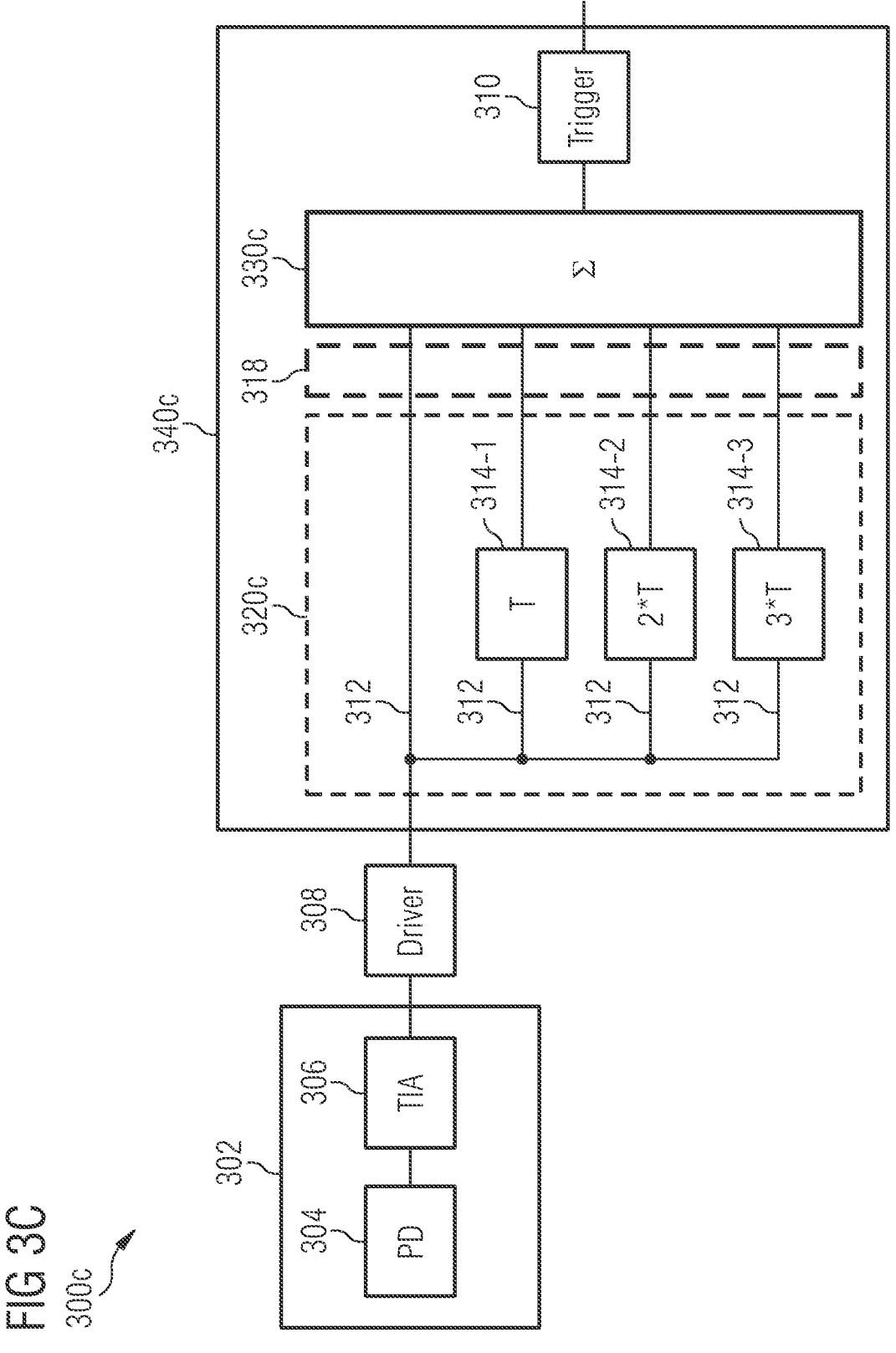

In some aspects, as shown in FIG. 3C, impedance matching may be provided (in addition or in alternative) between the delay stage 320c and the summation stage 330c. Impedance matching at the output of the delay stage 320c may prevent reflections and signal distortion. The summation stage 330c may also be configured to have low noise.

The light detection system 300c (e.g., the processing circuit 340c) may include an impedance matching stage 318 coupled between the delay stage 320c and the summation stage 330c. As exemplary implementations, the impedance matching stage 318 may include at least one of an additive operational-amplifier, a transformer (an impedance-matching transformer), or a passive network. The transformer may be adapted depending on the output impedance of the delay stage 320c and the input impedance of the summation stage 330c. For example, the transformer may include an input coupled with the delay stage 320c and an output coupled with the summation stage 330c, and the output may have a secondary winding having a (second) number of turns greater than a (first) number of turns of a primary winding of the input. This may provide matching a high input impedance of the summation stage with a low output impedance of the delay stage. The passive network may include at least one inductance and one capacitance (e.g., at least one component having an impedance associated therewith and at least one component having a capacitance associated therewith). The impedance and the capacitance may be adapted to provide the desired impedance matching. In some aspects, the passive network may be realized by means of a printed circuit board design.

As shown in FIG. 3A to FIG. 3E, the delay stage 320a, 320b, 320c, 320d, 320e may include a plurality of processing paths 312 over which the received light signal may be distributed (e.g., four processing paths in the exemplary configurations shown in FIG. 3A to FIG. 3E). In the configurations shown in FIG. 3A to FIG. 3E, one of the processing paths 312 may be configured to leave the received light signal unaltered, e.g. the received light signal along this path may be not delayed (the respective branched signal may be a non-delayed version of the received light signal). It is understood that other configurations in which the received light signal is delayed along each processing path 312 may be provided, or in which the received light signal is not delayed along more than one processing path 312.

In the configurations in FIG. 3A to FIG. 3C, the delay stage 320a, 320b, 320c may include delay elements (e.g., first to third delay elements 314-1, 314-2, 314-3, collectively referred to as delay elements 314) configured to impose a delay on the received light signal provided at the respective processing path 312 (to provide a respective branched signal as delayed representation of the received light signal). The delay elements 314 may be configured to provide a respective delay that is an integer multiple of a predefined delay period (e.g., the first delay element 314-1 may delay the signal by 1*T, the second delay element 314-2 may delay the signal by 2*T, the third delay element 314-3 may delay the signal by 3*T, etc.), e.g. a delay with respect to the non-delayed branched signal provided by the processing path without a delay element.

Figure 3D:
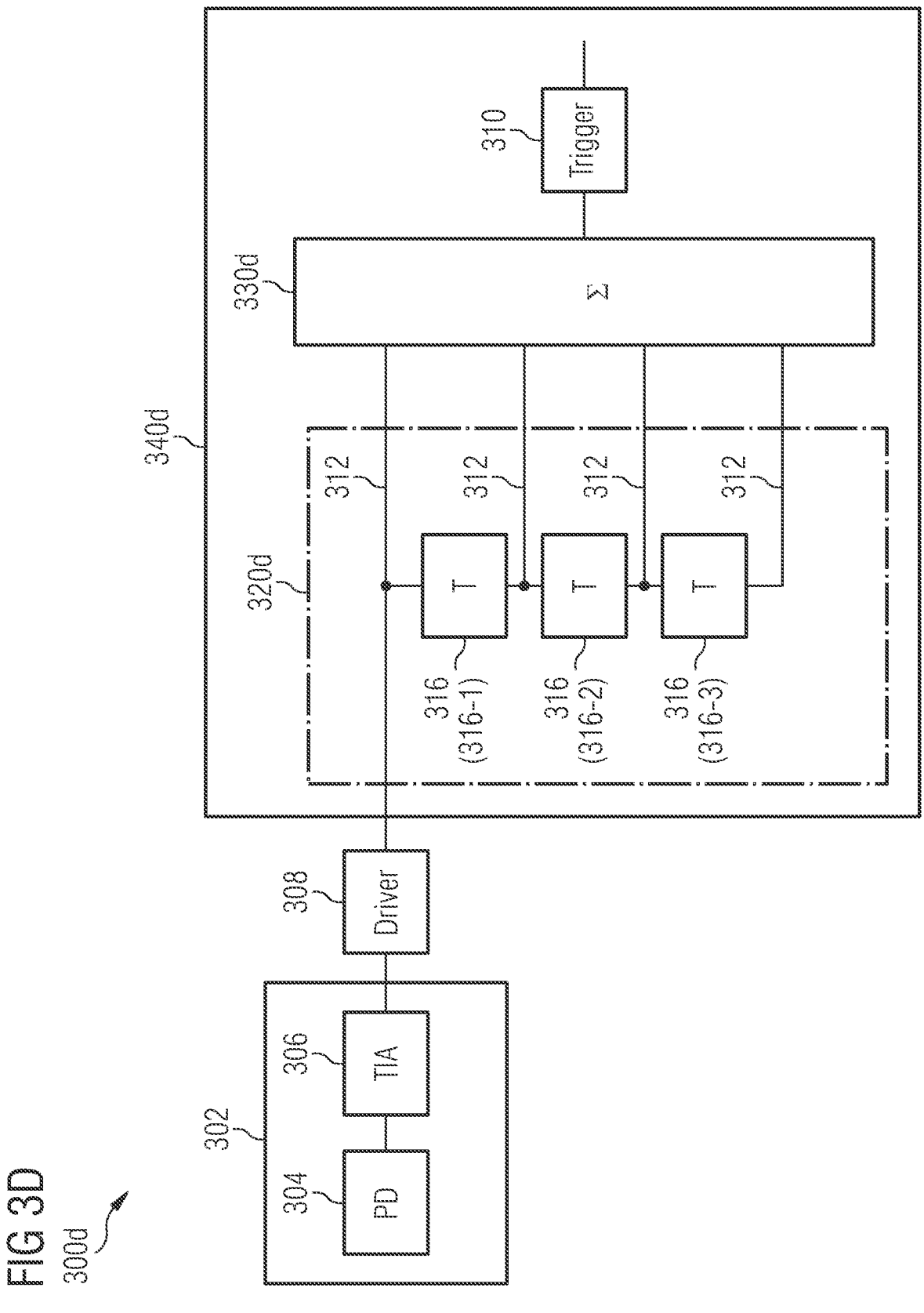
Figure 3E:
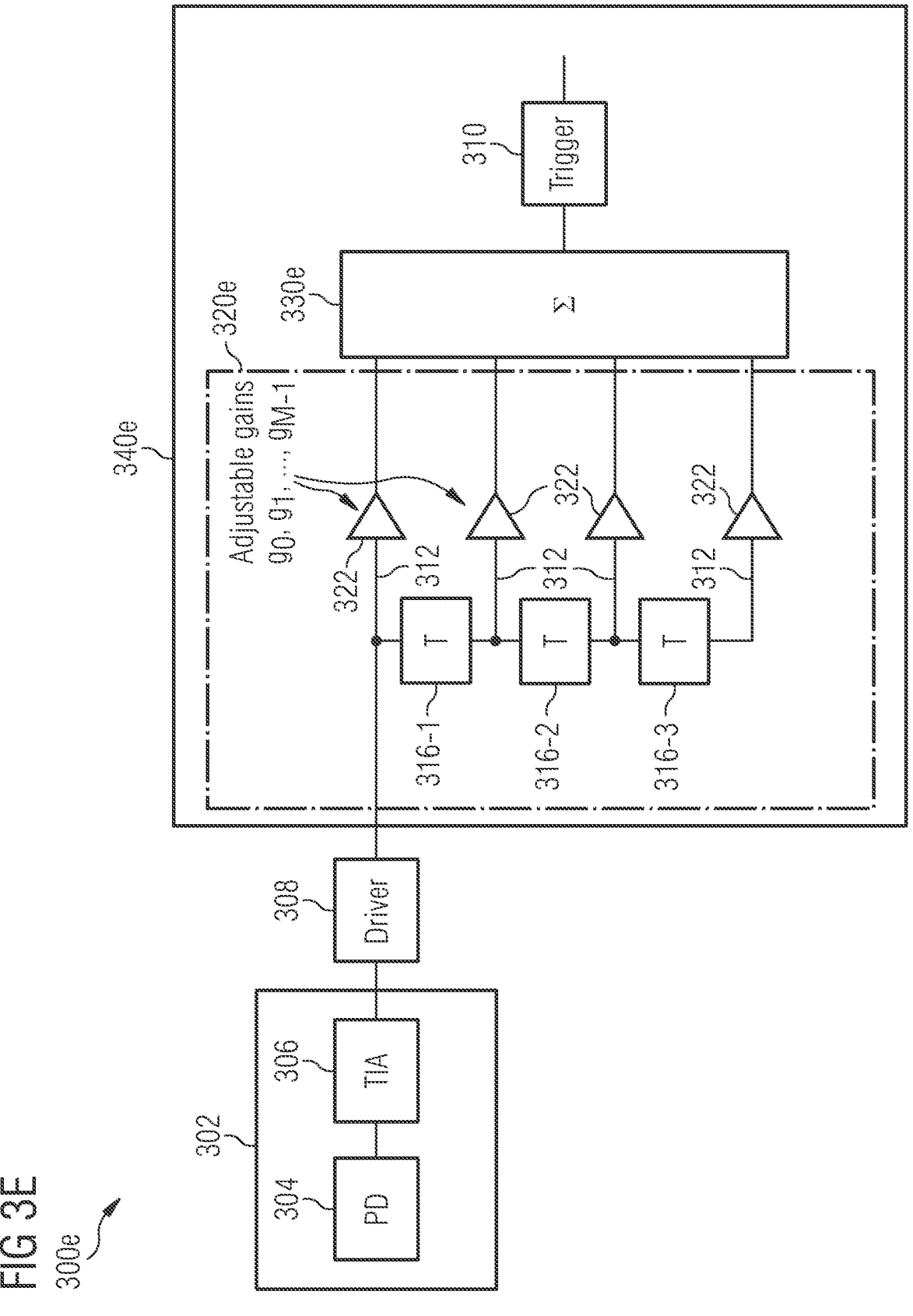

In the configurations in FIG. 3D and FIG. 3E, the delay stage 320d, 320e may include delay elements (e.g., first to third delay elements 316-1, 316-2, 316-3, collectively referred to as delay elements 316) that form a tapped delay-line. The delay elements 316 may be configured to provide a same delay (T) to delay the signal propagating along the respective processing path 312 with respect to the signal propagating along the adjacent processing path 312. A tapped delay-line implementation may provide that less elements are used in total.

As shown in FIG. 3E, the light detection system 300e (e.g., the processing circuit 340e) may be configured to provide adjustable gains (g0, g1, . . . , gM−1) to the branched signals provided by the delay stage 320e. Each processing path 312 may be associated with a respective adjustable gain. Illustratively, the processing circuit 340e (e.g., the delay stage 320e) may be configured to combine the plurality of branched signals with a plurality of adjustable gains. In the exemplary implementation shown in FIG. 3E, the processing circuit 340e (e.g., the delay stage 320e) may include a plurality of amplifiers 322, each associated with a respective adjustable gain. In some aspects, each processing line 312 may include a respective amplifier 322.

The adjustable gains g0, g1, . . . , gM−1 may provide a more advanced filtering. The adj us table gains g0, g1, . . . , gM−1 may be dynamically adapted during runtime, thus providing flexibility for the signal processing. The adjustable gains g0, g1, . . . , gM−1 may be real values, e.g. positive and/or negative values.

As an alternative implementation (not shown), the processing circuit 340e (e.g., the delay stage 320e) may include a switch matrix with gains in 0 and 1 for providing the adjustable gains. The switch matrix in combination with the delay elements 316 (e.g., with the tapped delay-line) may provide "programmable delays". The switch matrix may be controlled by electronic signals, e.g. via software. This may provide a dynamic detector configuration, e.g. to be adaptive over time, or to realize filter functions. For example, the switch matrix may be implemented using PIN-diodes with controllable bias voltage.

Further possible realizations of a light detection system will be described in relation to FIG. 4A to FIG. 4E.

FIG. 4A, FIG. 4B, FIG. 4C, FIG. 4D, and FIG. 4E each shows schematically a respective light detection system 400a, 400b, 400c, 400d, 400e according to various aspects.

These light detection systems 400a, 400b, 400c, 400d, 400e may be an exemplary implementation of the light detection system 100, 300a, 300b, 300c, 300d, 300e described in FIG. 1, and FIG. 3A to FIG. 3E. It is understood that the representation in FIG. 4A to FIG. 4E may be simplified for purpose of explanation and the light detection system 400a, 400b, 400c, 400d, 400e may include additional components, e.g. as described above in relation to FIG. 1, and FIG. 3A to FIG. 3E.

The light detection system 400a, 400b, 400c, 400d, 400e may include a detector 402a, 402b, 402c, 402d, 402e (e.g., configured as the detector 102, 202, 302 described in relation to FIG. 1 to FIG. 3E) and a processing circuit 404 (e.g., configured as the processing circuit 106, 240, 340a, 340b, 340c, 340d, 340e described in relation to FIG. 1 to FIG. 3E).

The processing circuit 404 may include a delay stage 406 and a summation stage 408 (e.g. configured, respectively, as the modification stage 120, 220, 320a, 320b, 320c, 320d and the combination stage 130, 230, 330a, 330b, 330c, 330d, 330e described in relation to FIG. 1 to FIG. 3E).

The delay stage 406 may include one or more delay elements, e.g. first and second delay elements 410-1, 410-2 in this exemplary configuration (collectively referred to as delay elements 410-1, 410-2). Each delay element may be configured to impose a respective delay (1) onto the branched signal associated with the processing path along which the delay element is disposed (e.g., the first delay element 410-1 may be associated with a first delay 11, and the second delay element 410-2 may be associated with a second delay 12). The delay associated with a delay element may be different from any other delay associated with the other delay elements (e.g., $\tau_1 \neq \tau_2$), and each delay may be equal to or greater than zero ($\tau_1 \geq 0$, and $\tau_2 \geq 0$).

Figure 4A:
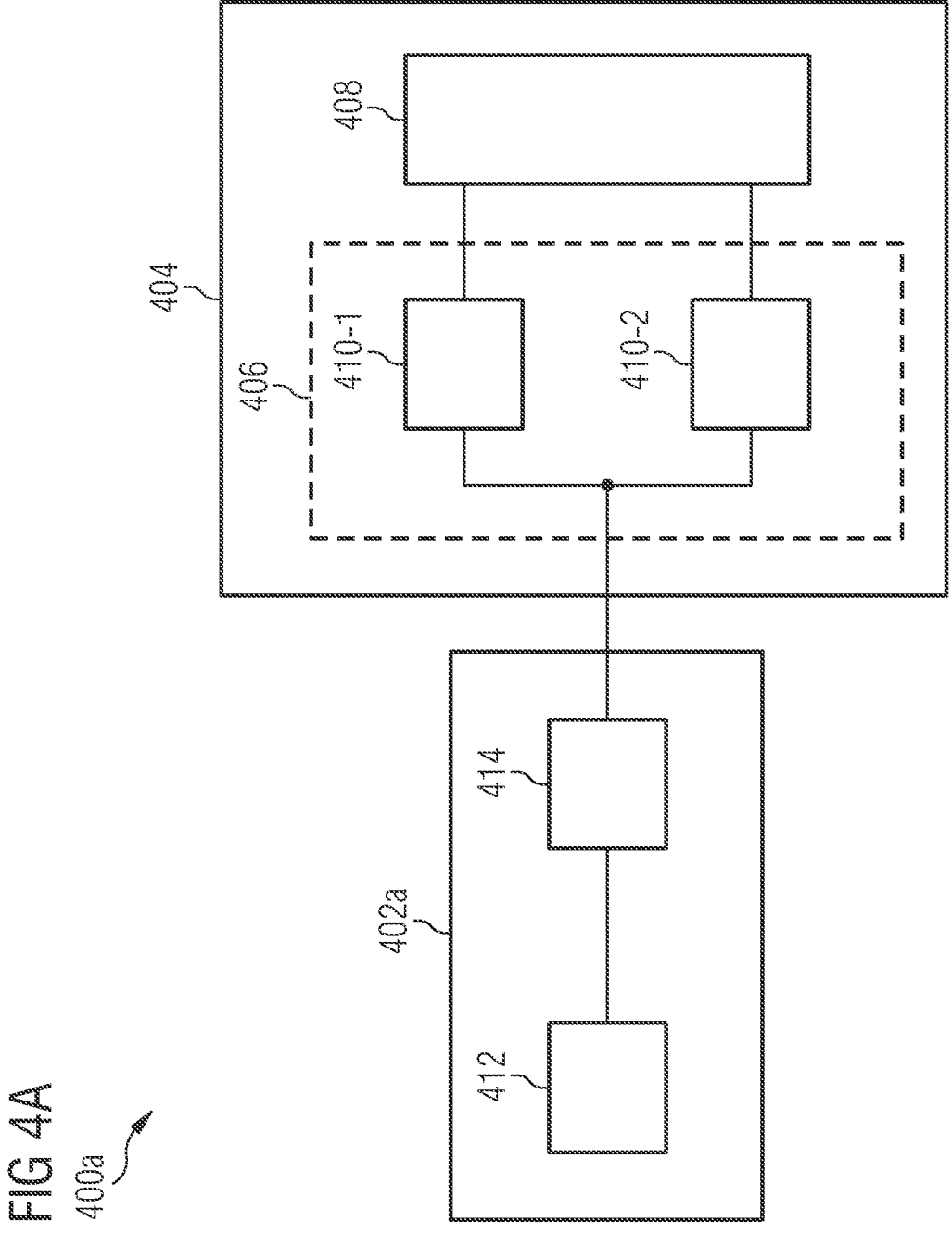
FIG. 4A to FIG. 4E each shows schematically a light detection system according to various embodiments.
Figure 4B:
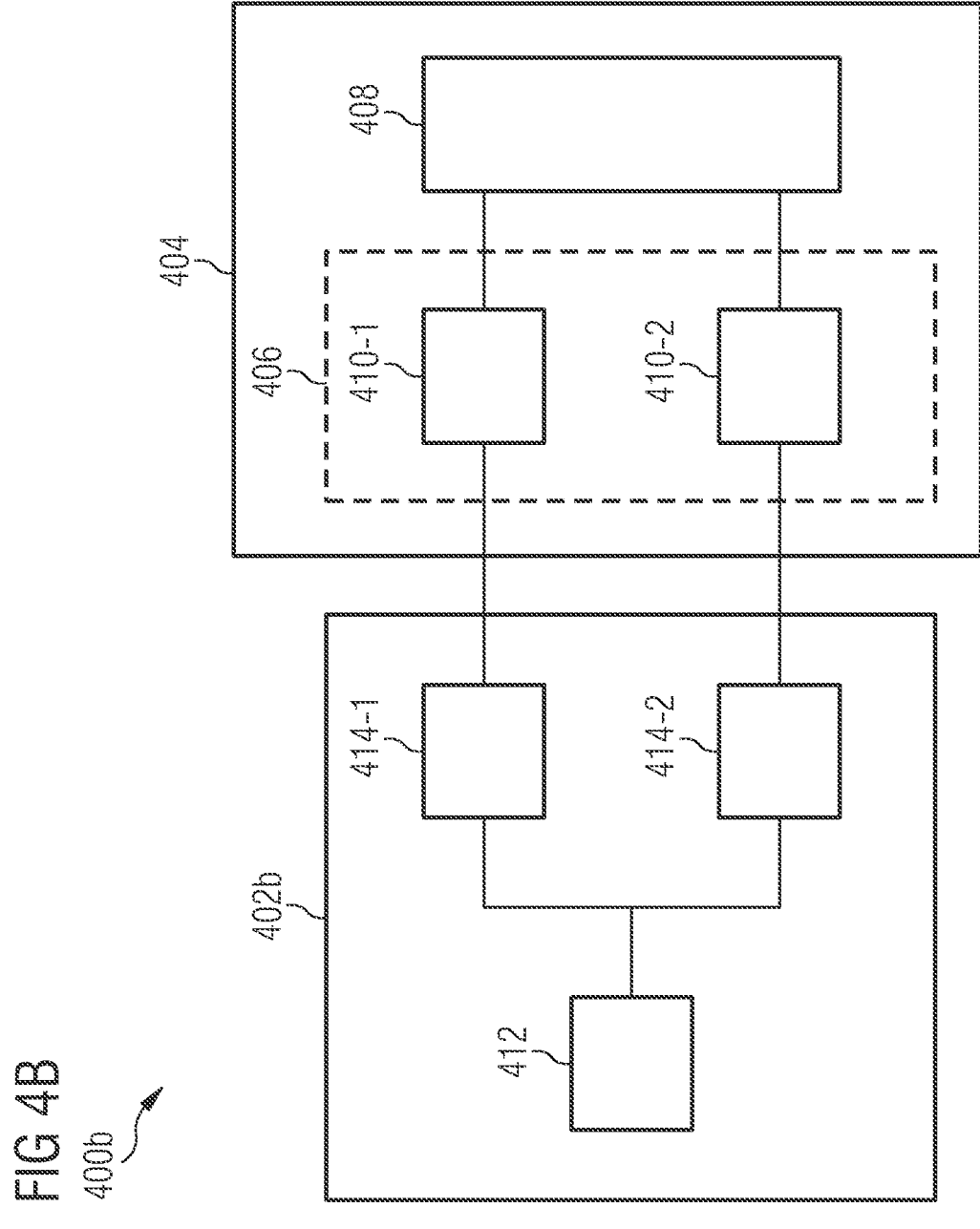

In the configuration of the light detection system 400a in FIG. 4A, the detector 402a may include a sensing element 412 (e.g., a photo diode) and an amplifier circuit 414 (e.g., a transimpedance amplifier), and the received light signal provided by the detector 402a may be distributed to the delay elements 410-1, 410-2.

In the configuration of the light detection system 400b, 400c, 400d, 400e in FIG. 4B to FIG. 4E the detector 402b, 402c, 402d, 402e (e.g., the amplifier circuit 414) may include a plurality of amplifier circuits (e.g., a plurality of transimpedance amplifiers). The detector 402b, 402c, 402d, 402e may include an amplifier circuit for each processing path (e.g., for each delay element 410) included in the delay stage 406, e.g. a first amplifier circuit 414-1 (associated with the first delay element 410-1) and a second amplifier circuit 414-2 (associated with the second delay element 410-2) in the exemplary configuration in FIG. 4B to FIG. 4E. The detector 402b, 402c, 402d, 402e may be configured to distribute the response signal provided by the sensing element 412 to the plurality of amplifier circuits. This configuration may provide a flexible and dynamic adaptation of the amplification of the signal provided by the sensing element 412, e.g. with the possibility of providing different amplifier gains to different processing paths.

Illustratively, in the configuration of the light detection system 400b, 400c, 400d, 400e in FIG. 4B to FIG. 4E, the received light signal may include (e.g., may be divided into) a plurality of received light signals (e.g., a first received light signal and a second received light signal). Each received light signal may be associated with a respective branched signal.

Figure 4C:
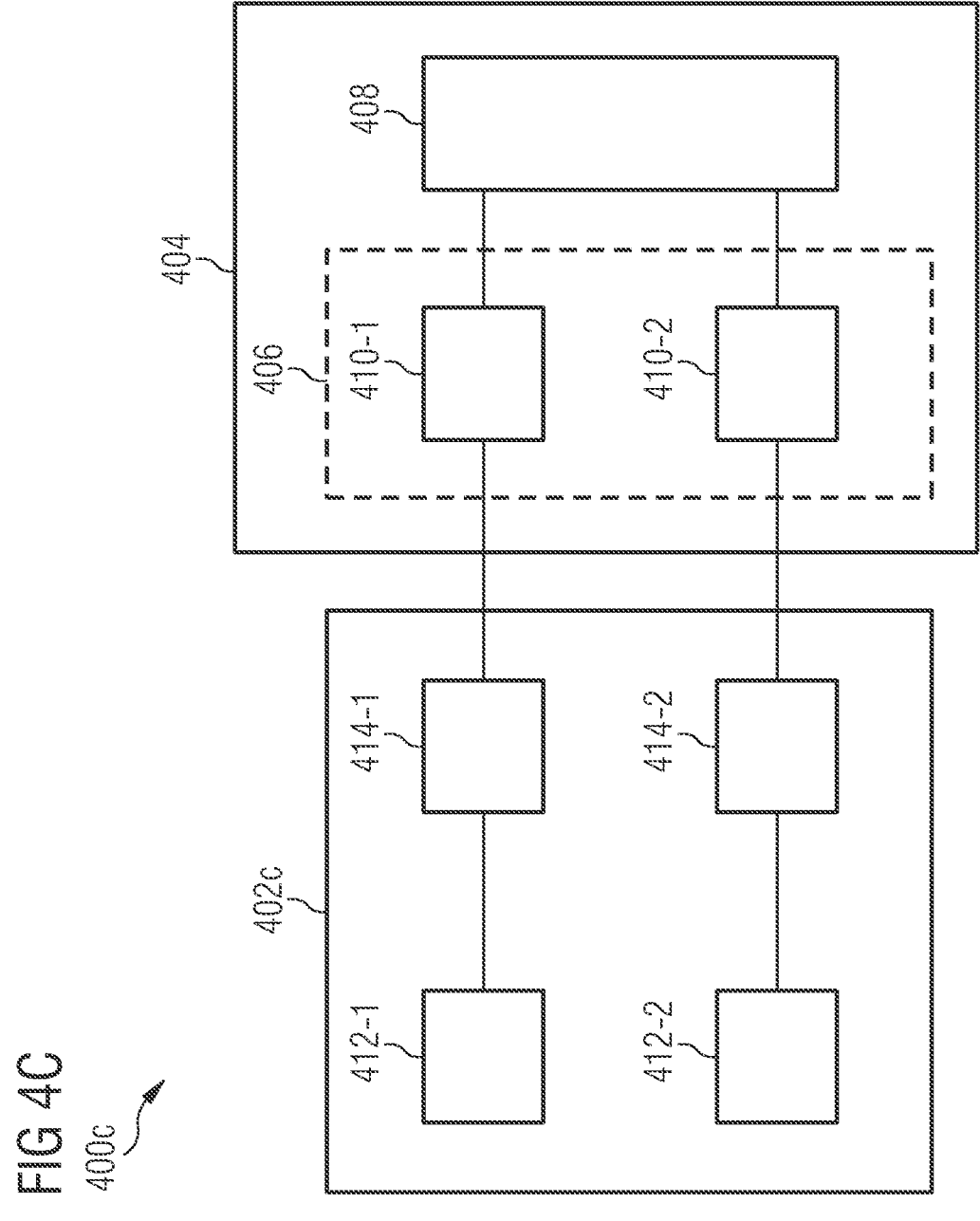
Figure 4D:
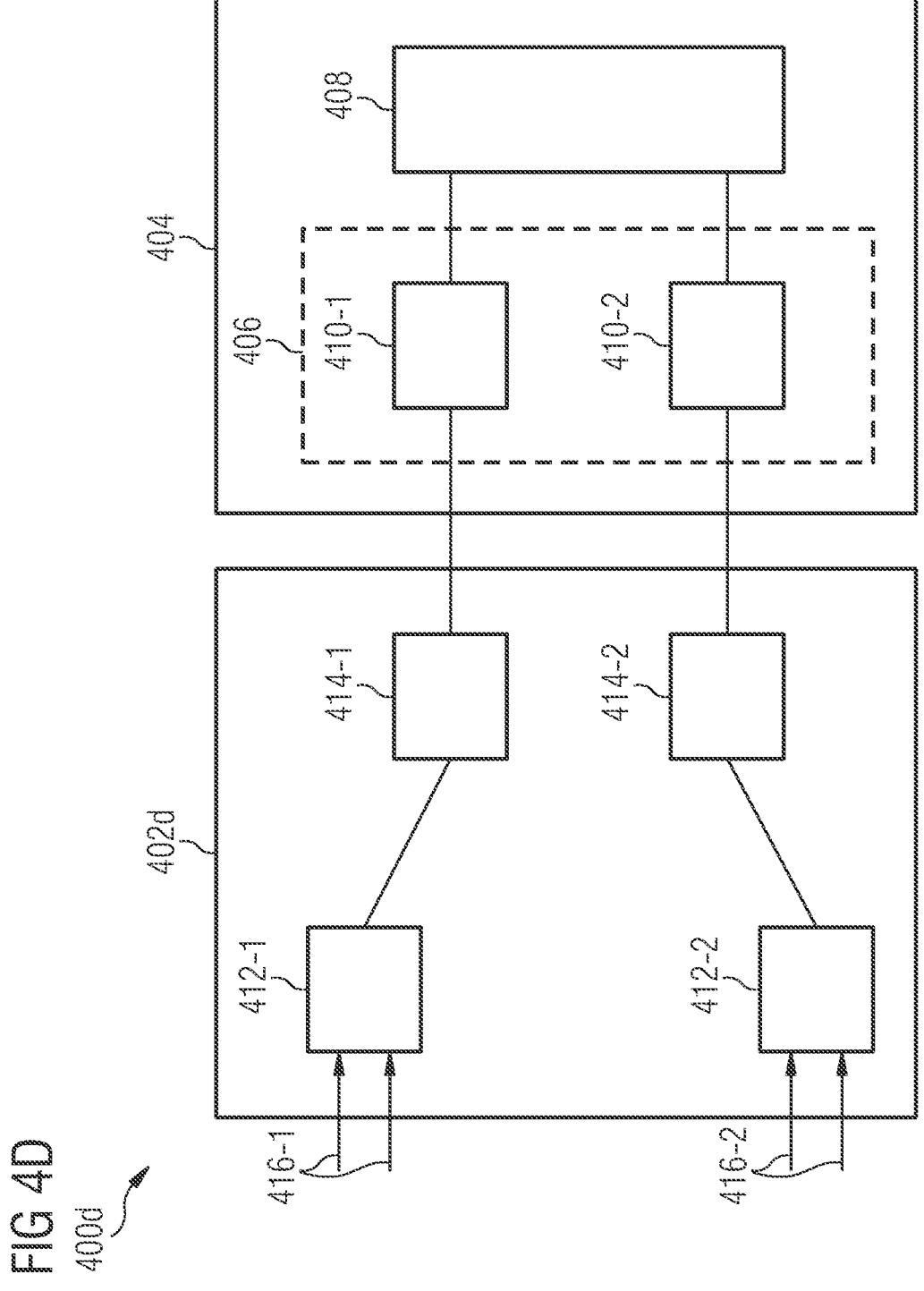
Figure 4E:
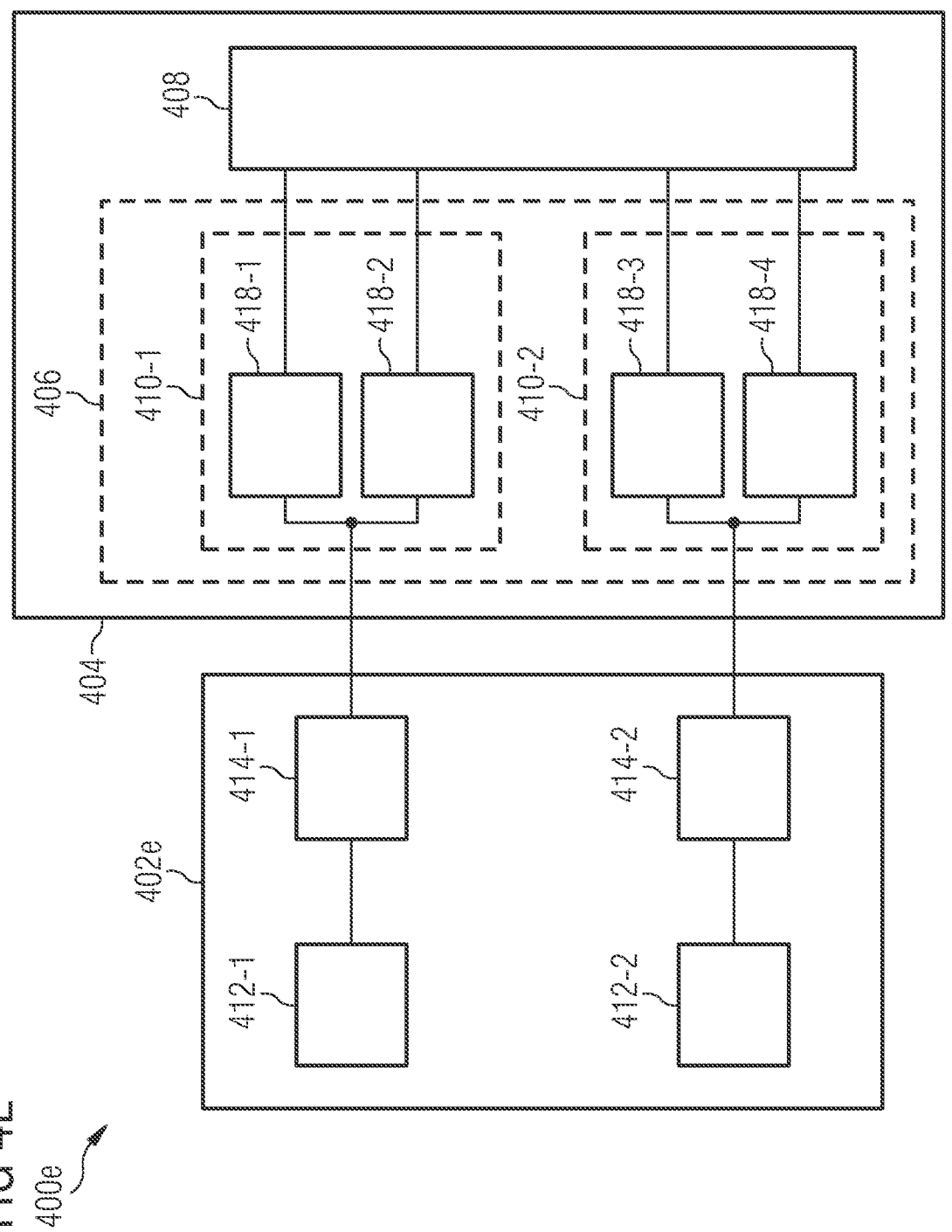

In the configuration of the light detection system 400c, 400d, 400e in FIG. 4C to FIG. 4E the detector 402c, 402d, 402e (e.g., the sensing element 412) may include a plurality of sensing elements, e.g. a plurality of photo diodes. The detector 402c, 402d, 402e may include a sensing element for each amplifier circuit (and/or for each processing path), e.g. a first sensing element 412-1 (associated with the first amplifier circuit 414-1) and a second sensing element 412-2 (associated with the second amplifier circuit 414-2) in the exemplary configuration in FIG. 4C to FIG. 4E. The use of a plurality of sensing elements may provide further design options, e.g. addressing functional safety requirements that call for multiple detectors, and/or may provide the means to further increase the signal-to-noise ratio by adding signal branches with independent noise components to the system. As shown in FIG. 4E, the delay elements 410-1, 410-2 may each be configured to provide a respective delay stage, with respective processing paths. Illustratively, in the configuration shown in FIG. 4E, the delay elements 410-1, 410-2 may be understood as delay sub-stages, each including respective delay elements (e.g., first to fourth delay elements 418-1, 418-2, 418-3, 418-4, in the exemplary configuration in FIG. 4E). The use of a plurality of sensing elements may provide a "branching" of the received light signal at the analog level.

In the configuration in FIG. 4C and FIG. 4E, the first and second sensing elements 412-1, 412-2 may be close to one another. For example, the first and second sensing elements 412-1, 412-2 may be two elements of an avalanche photo diode array, or two cells of a silicon photo multiplier. In the configuration in FIG. 4D, the first and second sensing elements 412-1, 412-2 may be spaced apart from one another such that they may receive different light signals (e.g., the first sensing element 412-1 may receive a first light signal 416-1, and the second sensing element 412-2 may receive a second light signal 416-2). The different light signals may be originating from the reflection of a single emitted light signal from an object, so that they may be correlated with one another (although not identical).

Figures 5A, 5B, 5C:
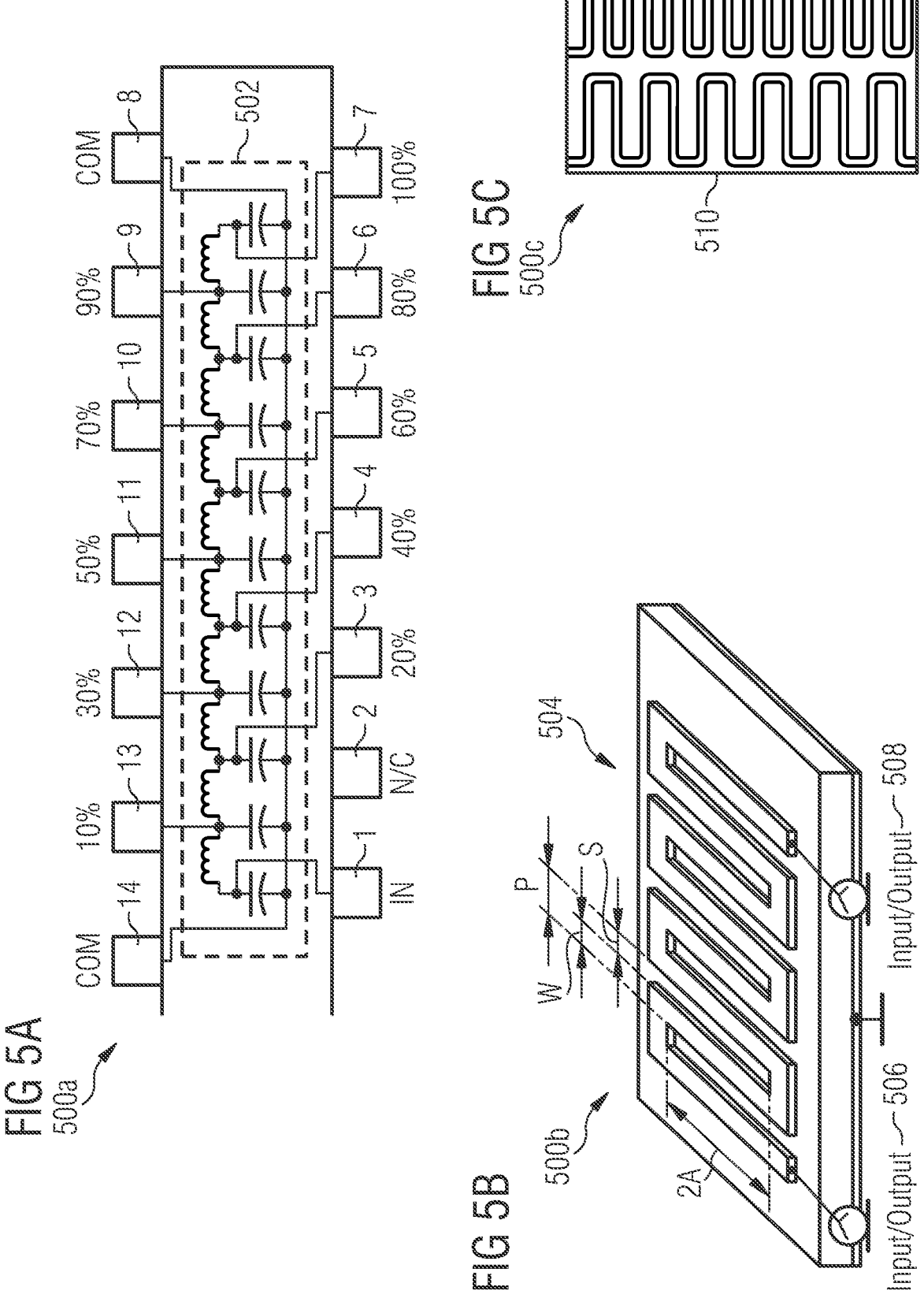
FIG. 5A, FIG. 5B, and FIG. 5C each shows schematically a component of a delay stage according to various embodiments.

FIG. 5A, FIG. 5B, and FIG. 5C show a respective component 500a, 500b, 500c for use in a delay stage (e.g., in the delay stage 120, 220, 320a, 320b, 320c, 320d, 320e, 406 described in relation to FIG. 1 to FIG. 4E).

As shown for the component 500a in FIG. 5A, one or more delay elements 502 may form a tapped delay-line (a passive delay-line). The one or more delay elements 502 may (each) include an inductance and a capacitance (e.g., an inductor and a capacitor). The one or more delay elements 502 may provide a sequentially increasing delay (e.g., with respect to a non-delayed path for the received light signal), for example going from 10% delay (e.g., 10% of a pre-defined delay period) to 100% delay (the full delay period) in 10% increment steps. The tapped delay-line As shown for the component 500b in FIG. 5B, a delay element may include (e.g., may be realized as) a circuit 504 configured to impose the respective delay to the received light signal. The circuit 504 may include an input 506 at which the received light signal is provided and an output 508 from which the delayed (branched) signal is output (the input and output may also be switched with one another in the configuration in FIG. 5B). The circuit 504 may include one or more traces (e.g., metal traces) along which the signal propagates. The circuit 504 may be configured such that the received light signal is delayed upon propagation through the circuit 504. The dimensions of the circuit 504, e.g. the width W of a trace, a period P between traces, a length A of a trace, and/or a spacing S between traces, may be selected to provide the desired delay. As an exemplary implementation, the circuit 504 may include an ASIC.

As shown for the component 500c in FIG. 5C, a delay element may include (e.g., may be realized as) a printed circuit board 510. The printed circuit board 510 may include a path (e.g., a metal trace) for the received light signal, along which the signal may propagate. The path may be configured to impose the desired delay onto the received light signal.

Possible examples of a light signal that may be used in combination with the detection scheme described herein are illustrated in FIG. 6A to FIG. 6D. The light signals may be adapted in accordance with the improved detection capabilities provided by the detection scheme.

Figure 6A:
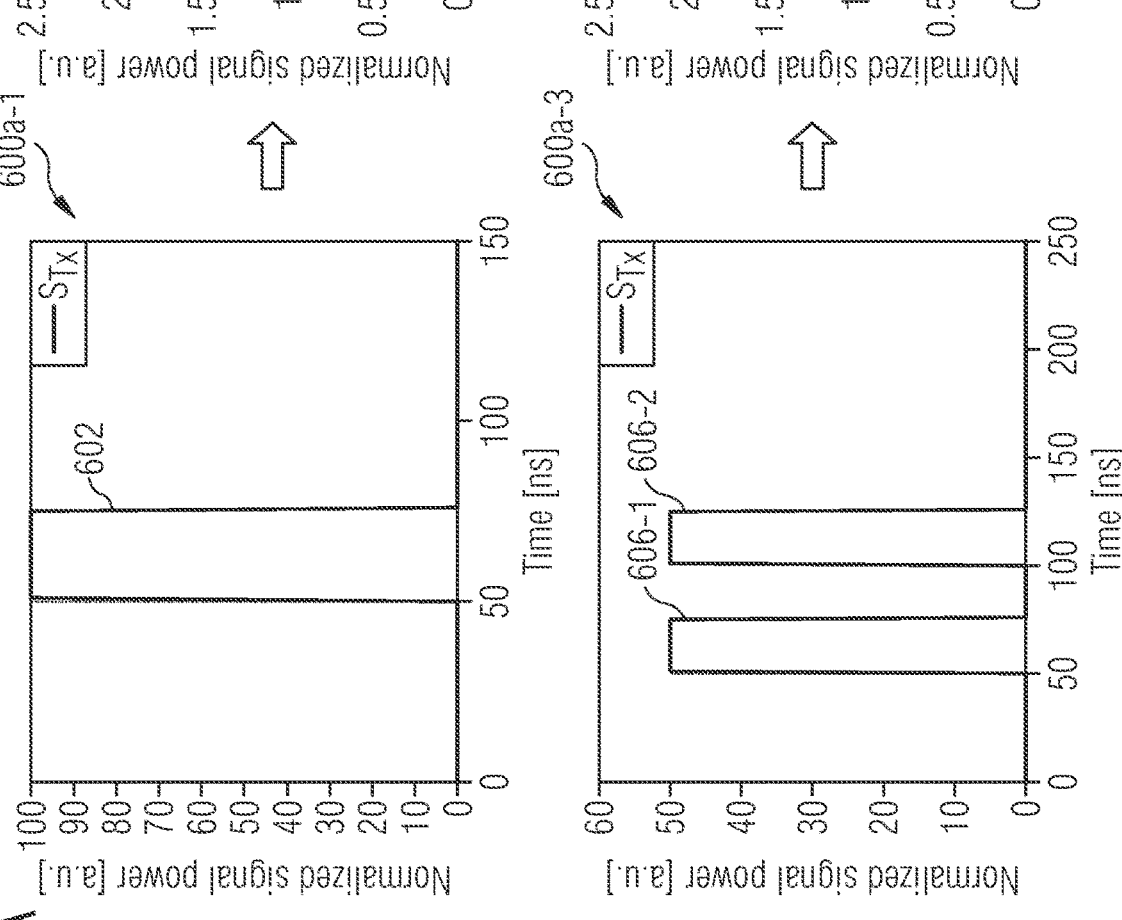
FIG. 6A, FIG. 6B, FIG. 6C, and FIG. 6D each shows a series of graphs associated with a light signal according to various embodiments.

FIG. 6A shows a series of graphs 600a-1, 600a-2, 600a-3, 600a-4 illustrating the spreading of signal power over several pulses. The graphs 600a-1, 600a-2, 600a-3, 600a-4 may be related to a conventional detection scheme, not implementing the adapted strategy described herein. The graphs 600a-1, 600a-2, 600a-3, 600a-4 may include a time in the horizontal axis (in nanoseconds) and a power in the vertical axis (in a.u.). In the graphs 600a-1, 600a-2, 600a-3, 600a-4 a signal is illustrated in terms of signal component ($S_{TX}$, $S_{RX}$), noise component ($N_g$), and signal component with superimposed noise component ($S_{RX}+N_g$)

A light signal, as shown in the graph 600a-1, may include a single pulse 602 containing all the emitted power (e.g., 100 W, as a numerical example). The single pulse 602 may be detected to provide a received light signal, as shown in the graph 600a-2, including a single pulse 604. Using a conventional TDC approach with the power contained in a single pulse, a SNR of about 20 dB may be provided considering this example.

As an alternative approach, as shown in the graph 600a-3, the emitted power may be distributed over a plurality of light pulses, e.g. two light pulses 606-1, 606-2 each having a peak power of 50 W in the exemplary configuration shown in FIG. 6A. The two pulses 606-1, 606-2 may be detected to provide a received light signal including received light pulses 608-1, 608-2. Using a conventional TDC approach with the power spread over two pulses 606-1 and 606-2, the spreading of the power leads to a reduced SNR, e.g. to a SNR of about 16.99 dB in this exemplary configuration.

Figure 6B:
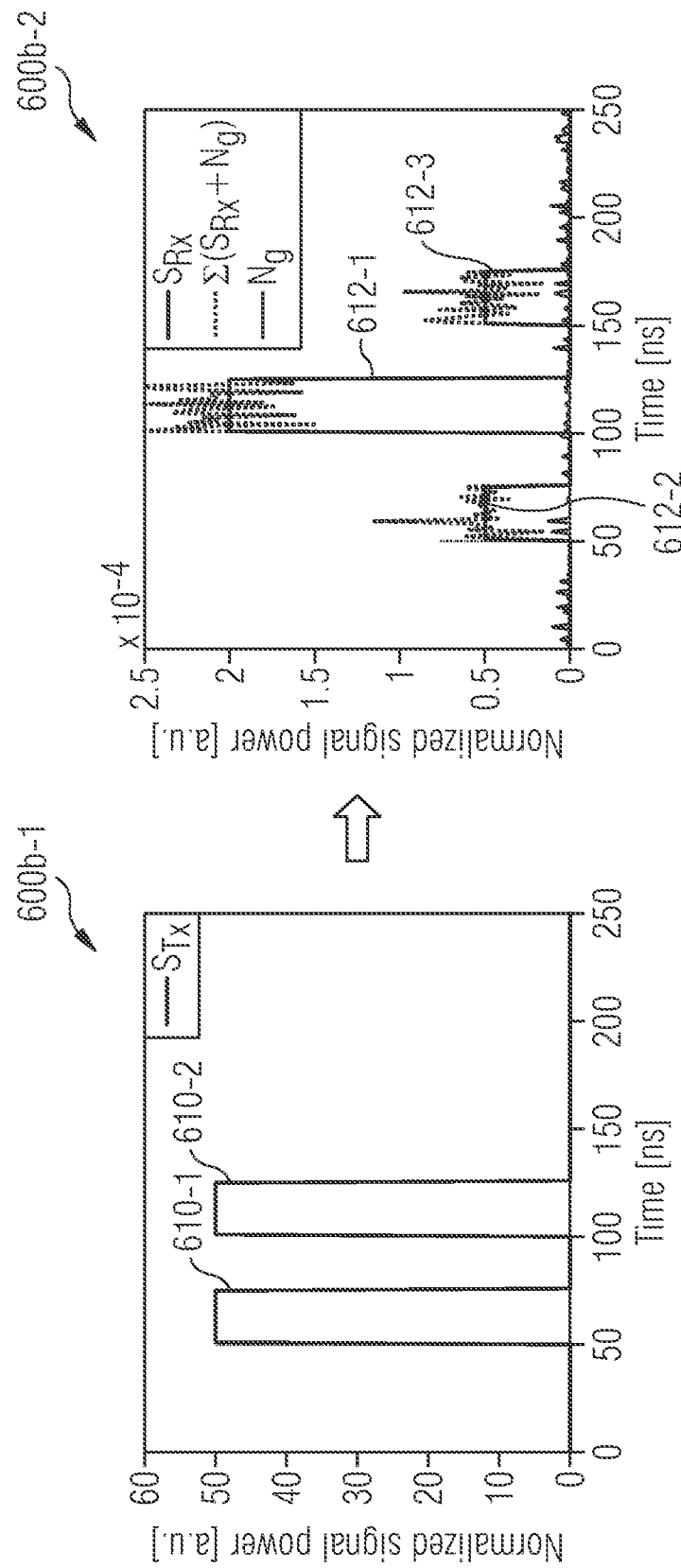

FIG. 6B shows a series of graphs 600b-1, 600b-2 illustrating the spreading of signal power over several pulses. The graphs 600b-1, 600b-2, may be related to detection according to the adapted detection scheme described herein. The graphs 600b-1, 600b-2 may include a time in the horizontal axis (in nanoseconds) and a power in the vertical axis (in a.u.). In the graphs 600b-1, 600b-2 a signal is illustrated in terms of signal component ($S_{TX}$, $S_{RX}$), noise component ($N_g$), and signal component with superimposed noise component ($S_{RX}+N_g$).

As shown in the graph 600b-1, 600b-2, in some aspects a light signal may include one or more light pulses, e.g. a plurality of light pulses (first and second light pulses 610-1, 610-2 in the exemplary configuration in FIG. 6B). The emitted power may be distributed between the light pulses (e.g., each light pulse may have a same power, or different light pulses may have different powers, see also FIG. 6C and FIG. 6D). As a numerical example, at least one light pulse may have a peak power in the range from 1 W to 100 W, for example in the range from 10 W to 100 W. In the exemplary configuration in FIG. 6B, the first and second light pulses 610-1, 610-2 may each have a peak power of 50 W.

For example, the generation of multiple pulses may be used to temporally provide more output power, e.g. in a LIDAR system for areas within the field of view with distant objects only, while overall still being compliant with eye-safety regulations.

The duration of a light pulse and the spacing (in time) between adjacent light pulses may be adapted in accordance with a desired operation to be carried out by means of the light signal. As a numerical example, at least one light pulse (e.g., each light pulse) may have a duration in the range from 0.1 ns to 100 ns, for example in the range from 1 ns to 100 ns, for example a duration of 50 ns. As another numerical example, a spacing between light pulses may be in the range from about from 1 ns to 100 ns, for example 50 ns or 25 ns.

In the case in which the light signal includes a plurality of light pulses, combining the plurality of branched signals with one another may include providing a constructive combination of the light pulses. In the configuration in FIG. 6B, combining the plurality of branched signals with one another may include providing a constructive combination of the first light pulse 610-1 with the second light pulse 610-2.

A delay stage may be configured to adapt the delay provided to the branched signals in accordance with the properties of the light pulses, to provide the desired construction combination, e.g. to time-shift the light pulses of a branched signal to provide constructive combination with the light pulses of another branched signal. Considering that the first light pulse 610-1 and the second light pulse 610-2 are spaced from one another by a time period (e.g., 50 ns in the configuration in FIG. 6B), the delay stage may be configured to provide a first branched signal and a second branched signal delayed with respect to one another by the time period. This may provide that a pulse in the second branched signal may combine constructively (illustratively, may overlap) with a pulse in the first branched signal. In the configuration in FIG. 6B, with a spacing of 50 ns, a time-shift of 50 ns may be provided (e.g., providing a delay of 0 ns for the first branched signal and a delay of 50 ns for the second branched signal).

As shown in the graph 600b-2, combining branched signals generated from the received light signal including the first light pulse 610-1 and the second light pulse 610-2 may provide a combined signal including a "combined pulse" 612-1 provided by the constructive combination of pulses in different branched signals. The combined signal may include additional pulses 612-2, 612-3 corresponding to the light pulses in the branched signals that did not combine with one another. In this configuration a SNR of about 20 dB may be provided for this exemplary case, i.e. similar to a conventional TDC approach in which a single pulse was emitted. Illustratively, the joint decoder performance may approach the performance of single pulse-system.

In some aspects, a time period between adjacent light pulses may be adapted according to the properties of a delay stage, e.g. based on the delay(s) provided by the delay stage. The time period may be adapted to compensate for deviations from an ideal behavior of the delay stage, e.g. deviations of a delay provided by a delay element from an ideal delay that such element should provide. For example, the time period between the first light pulse 610-1 and the second light pulse 610-2 may be selected based on a deviation from an expected delay and an actual delay provided by a processing circuit (e.g., by a delay stage) for delaying a second branched signal with respect to a first branched signal. In some aspects, the timing of the individual pulses in a multi-pulse signal may be chosen in accordance with a programmable delay-line configuration.

Assuming that an analog delay-line may have component tolerances affecting the delay for the individual pulses within the multi-pulse, an initialization or training scheme may be provided that, on the emitter side, modifies the relative timing of the pulses within the multi-pulse until the component tolerances on the detector side (which may be hardware dependent) are compensated. The adjustments on the emitter side may be done via the timing of the pulses which may be controlled by software. The procedure modifying the relative timing of the pulses may be systematic, following an optimization algorithm, or may randomized. The initialization or training scheme may be performed once after production, or each time the system is started, or at regular time instants during operation In some aspects, the adaptation of the timing of the pulses may be used to dynamically modulate or control the output power. This may provide a reduced crosstalk between systems. Illustratively, concurrently operating systems may use multi-pulse configurations (and programmable delay-line configurations) that are "orthogonal" to each other, e.g. having good auto-correlation and/or good cross-correlation properties, or having good asynchronous cross-correlation properties. As a further example this may provide actively decreasing the impact of other alien signals, by providing the means to identify the own signal's signature. As a further example this may be used to implement signalling schemes, in which information is carried on a subset of sub-pulses that are analysed at the detector of another concurrently operating system (e.g. to disseminate warning messages). As another example, this may be used to implement data communication schemes.

Figure 6C:
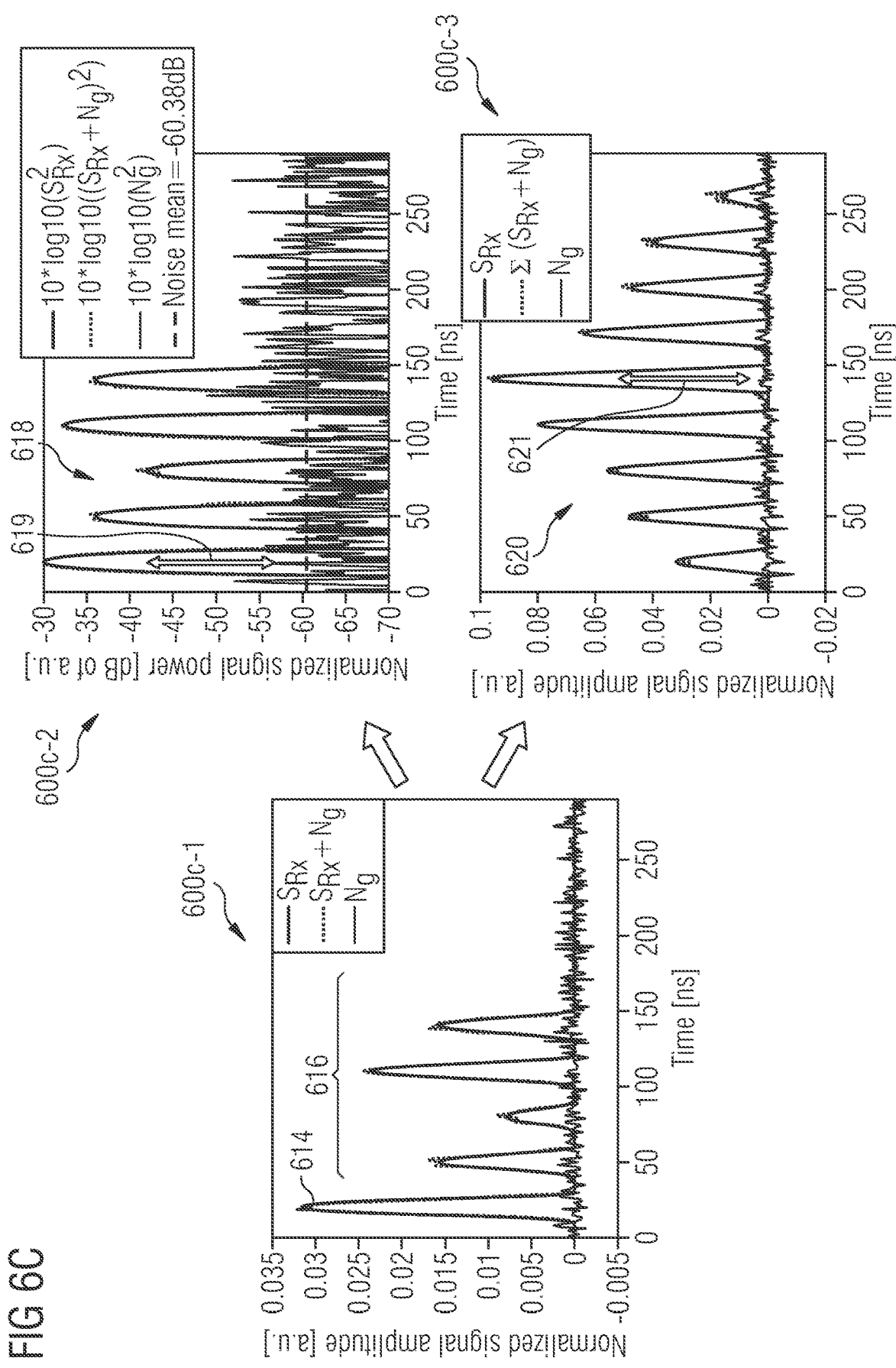

FIG. 6C shows a series of graphs 600c-1, 600c-2, 600c-3 associated with detection of a multi-pulse signal according to various aspects. The graphs 600c-1, 600c-3 may include a time in the horizontal axis (in nanoseconds) and an amplitude in the vertical axis (in a.u.). The graph 600c-2 may include a time in the horizontal axis (in nanoseconds) and a power in the vertical axis (in dB of a.u.) In the graphs 600c-1, 600c-2, 600c-3, a signal is illustrated in terms of signal component ($S_{RX}$), noise component ($N_g$), and signal component with superimposed noise component ($S_{RX}+N_g$). In the graph 600c-2 an average signal level of the noise is also illustrated, e.g. −60.38 dB as a numerical example.

In some aspects, as shown in the graph 600c-1, a received light signal may include a (main) pulse 614 assigned to a desired operation (e.g., ranging) and one or more other pulses 616 assigned to a secondary operation (e.g., data communication). As an example, the one or more other pulses 616 may include a pulse sequence that carries an ID (e.g., for identification of signals and crosstalk mitigation). As another example the one or more other pulses 616 may include a pulse sequence for signalling.

In case the multi-pulse signal was processed with a conventional approach, as shown in the graph 600c-2 for a signal 618 after processing, only the main pulse 614 would be considered, providing, in this example, a SNR of about 30.4 dB, as indicated by the arrow 619 (less than the SNR that may be achieved in the same scenario with the adapted detection scheme described herein, as shown in the graph 600c-3). Illustratively, using a normal detector, only the main pulse is considered.

In case the multi-pulse signal was processed with the adapted detection scheme described herein, as shown in the graph 600c-3, the secondary pulse(s) 616 may contribute to the enhancement of the signal component of the combined signal 620 (in addition to carrying out their secondary function), thus providing a comparatively higher SNR, e.g. about 32.9 dB in this exemplary case, as illustrated by the arrow 621. Illustratively, for using the proposed detection scheme all pulses are considered.

Figure 6D:
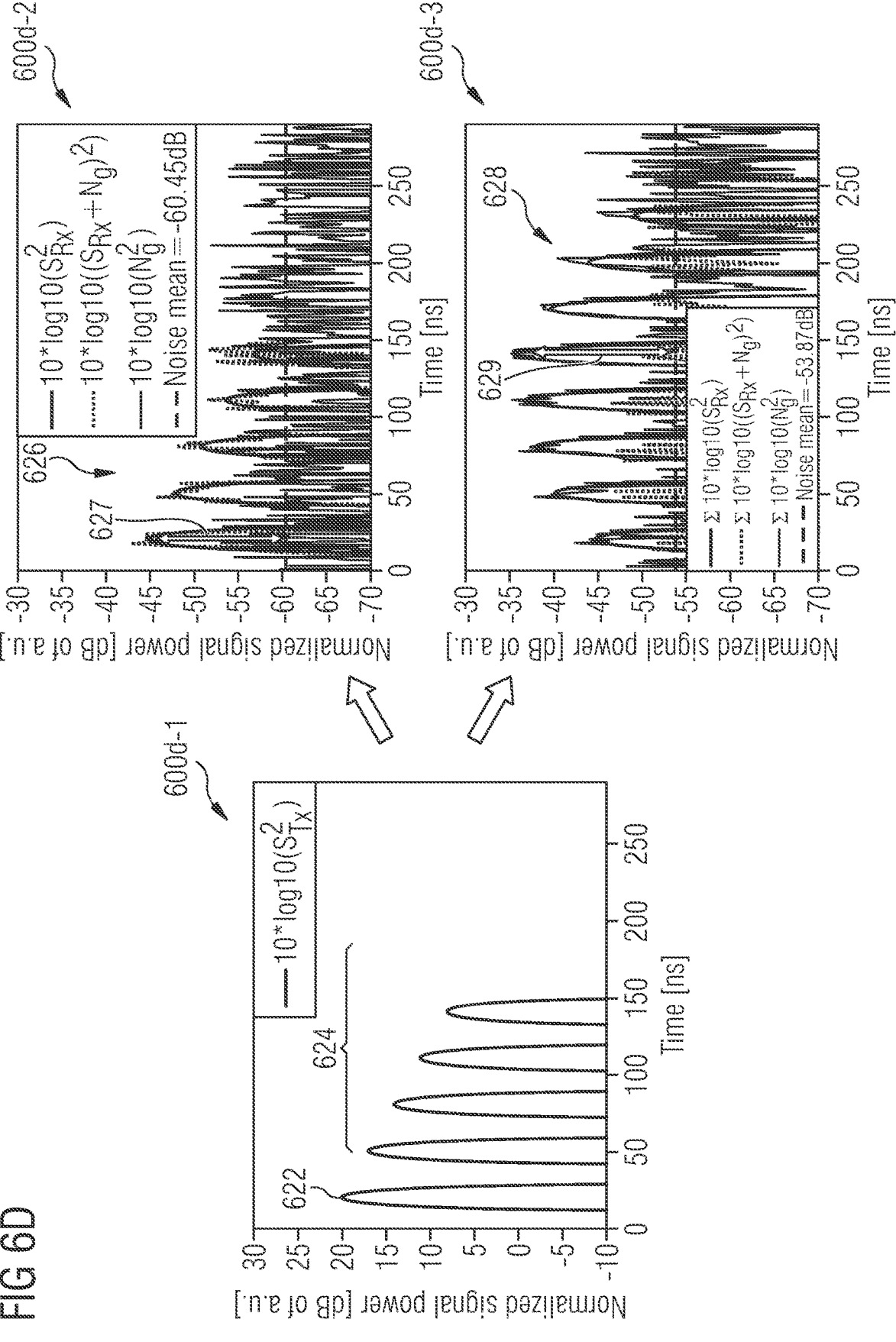

FIG. 6D shows a series of graphs 600d-1, 600d-2, 600d-3 associated with detection of a multi-pulse signal according to various aspects. The graphs 600d-1, 600d-2, 600d-3 may include a time in the horizontal axis (in nanoseconds) and a power in the vertical axis (in dB of a.u.). In the graphs 600d-1, 600d-2, 600d-3, a signal is illustrated in terms of signal component ($S_{TX}$, $S_{RX}$), noise component ($N_g$), and signal component with superimposed noise component ($S_{RX}+N_g$) In the graphs 600c-2 and 600c-3 an average signal level of the noise is also illustrated, e.g. −60.45 dB and −53.87 dB as numerical examples.

In some aspects, as shown in the graph 600d-1, an emitted light signal may include a (main) pulse 622 assigned to a desired operation (e.g., ranging) and one or more other pulses 624 assigned to a secondary operation (e.g., channel estimation or amplitude measurements). The signal shown in the graph 600d-1 may be a light signal as emitted, e.g. without noise (yet) superimposed thereto.

In case the multi-pulse signal was processed with a conventional approach, as shown in the graph 600d-2 for a signal 626 after processing, only the main pulse 622 would be considered, providing, in this example, a SNR of about 15.7 dB as indicated by the arrow 627 (less than the SNR that may be achieved in the same scenario with the adapted detection scheme described herein, as shown in the graph 600d-3). Illustratively, for using a normal detector, only the main pulse is considered.

In case the multi-pulse signal was processed with the adapted detection scheme described herein, as shown in the graph 600d-3, the secondary pulses 624 may contribute to the enhancement of the signal component of the combined signal 628, thus providing a comparatively higher SNR, e.g. about of 18 dB in this exemplary configuration, as indicated by the arrow 629. Illustratively, using the proposed detection scheme all pulses are considered.

The usage of multi-pulses might be beneficial for spreading (in other words, distributing) power over time, for controlling or modulating the power output using only a simple ON-OFF emitter frontend, for signal identification and/or crosstalk mitigation, for data communication, for signalling, for channel/SNR/amplitude measurements. A conventional LIDAR detector cannot take advantage of multi-pulses without increasing the system complexity and/or cost. Continuous sampling systems could take advantage of multi-pulses but they are complex and expensive, and they have a high power consumption. The detection scheme described herein provides a simple and cost-effective approach for taking full advantage of multi-pulse signals.

In the following, various aspects of this disclosure will be illustrated.

Example 1 is a light detection system including: a detector configured to provide a received light signal; and a processing circuit configured to: provide a plurality of branched signals each being representative of the received light signal; and combine the plurality of branched signals with one another to provide a combined signal, wherein the plurality of branched signals differ from one another in such a way that, as a result of the combination, respective signal components of the plurality of branched signals combine in a constructive manner and respective noise components of the plurality of branched signals combine in an at least partially destructive manner.

In example 2, the light detection system according to example 1 may optionally further include that the processing circuit is configured to delay the plurality of branched signals with respect to one another, and that a delay between different branched signals is such that, as a result of the combination, the signal components of the branched signals combine constructively and the noise components of the branched signals combine at least partially destructively.

In example 3, the light detection system according to example 2 may optionally further include that the received light signal includes one or more signal features, that each branched signal includes one or more respective signal features representing the one or more signal features of the received light signal, and that the respective one or more signal features of a branched signal are time-shifted with respect to the respective one or more signal features of each other branched signal.

In example 4, the light detection system according to example 3 may optionally further include that the one or more signal features include one or more peaks.

In example 5, the light detection system according to any one of examples 1 to 4 may optionally further include that combining the branched signals with one another includes summing the branched signals with one another.

In example 6, the light detection system according to example 5 may optionally further include that the sum of the branched signals with one another is a weighted sum.

In example 7, the light detection system according to example 6 may optionally further include that the plurality of branched signals have a same weighing coefficient associated therewith.

In example 8, the light detection system according to example 6 may optionally further include that at least one branched signal has a different weighing coefficient associated therewith with respect to another branched signal.

In example 9, the light detection system according to any one of examples 2 to 8 may optionally further include that providing the plurality of branched signals includes delaying the received light signal by one or more predefined delays.

In example 10, the light detection system according to example 9 may optionally further include that at least one predefined delay of the one or more predefined delays is in the range from 0.1 ns to 200 ns, for example in the range from 1 ns to 20 ns.

In example 11, the light detection system according to example 10 may optionally further include that the at least one predefined delay is 10 ns.

In example 12, the light detection system according to any one of examples 9 to 11 may optionally further include that at least one predefined delay is associated with a duration of the received light signal. For example, at least one predefined delay may be a fraction of the duration of the received light signal.

In example 13, the light detection system according to any one of examples 9 to 12 may optionally further include that the one or more predefined delays include a plurality of predefined delays each associated with a respective integer multiple of a predefined delay period.

In example 14, the light detection system according to example 13 may optionally further include that the predefined delay period is in the range from 0.1 ns to 200 ns, for example, in the range from 1 ns to 20 ns.

In example 15, the light detection system according to example 13 or 14 may optionally further include that the plurality of predefined delays include a first delay being equal to the predefined delay period, and a second delay being two times the predefined delay period.

In example 16, the light detection system according to example 15 may optionally further include that the plurality of predefined delays further includes a third delay being three times the predefined delay period.

In example 17, the light detection system according to any one of examples 9 to 16 may optionally further include that the plurality of predefined delays includes a number of delays based on a ratio of a duration of the received light signal to the predefined delay period.

In example 18, the light detection system according to any one of examples 1 to 17 may optionally further include that the processing circuit includes a delay stage configured to receive the received light signal and to output the plurality of branched signals.

In example 19, the light detection system according to example 18 may optionally further include that the delay stage includes one or more delay elements each associated with a respective predefined delay.

In example 20, the light detection system according to example 19 may optionally further include that the processing circuit is configured to distribute the received light signal to each delay element of the one or more delay elements.

In example 21, the light detection system according to example 19 or 20 may optionally further include that the one or more delay elements includes a number of delay elements in the range from 1 to 16, for example in the range from 1 to 8, for example in the range from 2 to 4.

In example 22, the light detection system according to any one of examples 19 to 21 may optionally further include that the one or more delay elements form a tapped delay-line.

In example 23, the light detection system according to any one of examples 19 to 22 may optionally further include that at least one delay element includes an inductance and a capacitance.

In example 24, the light detection system according to any one of examples 19 to 23 may optionally further include that at least one delay element includes a circuit configured to impose the respective delay to the received light signal.

As an example the circuit may include an ASIC.

In example 25, the light detection system according to any one of examples 19 to 24 may optionally further include that at least one delay element includes a printed circuit board, the printed circuit board including a path for the received light signal, the path being configured to impose the respective delay onto the received light signal.

In example 26, the light detection system according to any one of examples 1 to 25 may optionally further include that the processing circuit includes at least one processing path for the received light signal along which the received light signal is not modified (e.g., not delayed).

In example 27, the light detection system according to any one of examples 1 to 26 may optionally further include that the processing circuit includes a summation stage configured to receive the plurality of branched signals, and configured to output the combined signal.

In example 28, the light detection system according to example 27 may optionally further include that the summation stage includes at least one of a transistor or an amplifier. As another example the summation stage may include a passive network. The passive network may include, for example, one or more resistors (a resistor network) and/or one or more transformers.

In example 29, the light detection system according to example 27 or 28 may optionally further include that the processing circuit further includes an impedance matching stage coupled between the delay stage and the summation stage.

In example 30, the light detection system according to example 29 may optionally further include that the impedance matching stage includes at least one of an additive operational-amplifier, a transformer, or a passive network.

In example 31, the light detection system according to example 30 may optionally further include that the transformer includes an input coupled with the delay stage and an output coupled with the summation stage, and that the output has a (secondary) winding having a (second) number of turns greater than a (first) number of turns of a (primary) winding of the input.

In example 32, the light detection system according to example 30 or 31 may optionally further include that the passive network includes a printed circuit board structure, the printed circuit board structure including at least an inductance and a capacitance.

In example 33, the light detection system according to any one of examples 1 to 32 may optionally further include that the processing circuit is configured to combine each branched signal with a respective adjustable gain.

In example 34, the light detection system according to example 33 may optionally further include that the processing circuit includes a plurality of amplifiers, each amplifier being associated with a respective adjustable gain.

In example 35, the light detection system according to any one of examples 1 to 34 may optionally further include that the processing circuit is further configured to generate a trigger signal to stop a time-of-flight measurement associated with the received light signal by using a signal component of the combined signal.

In example 36, the light detection system according to any one of examples 1 to 35 may optionally further include that the detector includes at least one photo diode configured to generate an analog signal in response to a light signal impinging onto the at least one photo diode.

In example 37, the light detection system according to example 36 may optionally further include that the at least one photo diode includes at least one of a PIN photo diode, an avalanche photo diode, or a silicon photomultiplier.

In example 38, the light detection system according to example 36 or 37 may optionally further include that the detector includes an amplifier circuit configured to amplify the analog signal generated by the at least one photo diode.

In example 39, the light detection system according to example 38 may optionally further include that the analog signal generated by the at least one photo diode is an analog signal of a first type, and the amplifier circuit is configured to convert the analog signal of the first type into an analog signal of a second type.

In example 40, the light detection system according to example 39 may optionally further include that the analog signal of the first type is or includes a current, and that the analog signal of the second type is or includes a voltage.

In example 41, the light detection system according to any one of examples 38 to 40 may optionally further include that the amplifier circuit includes a transimpedance amplifier.

In example 42, the light detection system according to any one of examples 1 to 41 may optionally further include that the light detection system further includes a driver configured to provide impedance matching between an output impedance of the detector and an input impedance of the processing circuit.

In example 43, the light detection system according to example 42 may optionally further include that the driver includes an input coupled with the detector and an output coupled with the processing circuit, and that the input has an input impedance associated therewith and the output has an output impedance associated therewith, and the input impedance is greater than the output impedance.

In example 44, the light detection system according to example 42 or 43 may optionally further include that the driver includes a transformer, and that the input of the transformer includes a first (primary) winding having a first number of turns, and the output of the transformer includes one or more second (secondary) windings each having a second number of turns (e.g., a same second number of turns or different second numbers of turns). The first number of turns may be greater than the second number of turns (e.g., greater than each second number of turns).

In example 45, the light detection system according to example 42 or 43 may optionally further include that the driver includes a passive network including at least one inductance and one capacitance. In some aspects, the passive network may be realized by means of a printed circuit board design.

Example 46 is a LIDAR system including a light detection system according to any one of examples 1 to 45.

Example 47 is a light detection system including: a detector configured to provide a received light signal, the received light signal including a signal component and a noise component; and a processing circuit configured to: associate a plurality of delays to the received light signal to provide a plurality of branched signals each associated with a respective delay of the plurality of delays, and combine the plurality of branched signals with one another to provide, based on the respective delays, a constructive combination of the respective signal components and an at least partially destructive combination of the respective noise components.

The plurality of delays may be selected to provide an at least partial overlap between the respective signal components of the plurality of branched signals.

Example 48 is the light detection system according to example 47 including one, or some, or all the features of the light detection system according to any one of examples 1 to 45.

Example 49 is a light detection system including: a detector configured to provide a received light signal; and a processing circuit configured to: provide a first branched signal and a second branched signal, the first branched signal and the second branched signal being representative of the received light signal, modify the second branched signal with respect to the first branched signal, and combine the first branched signal with the second branched signal to provide a combined signal, wherein the second branched signal is modified with respect to the first branched signal in such a way that, as a result of the combination, a first signal component of the first branched signals combines in a constructive manner with a second signal component of the second branched signal, and a first noise component of the first branched signal combines in an at least partially destructive manner with a second noise component of the second branched signal.

Example 50 is the light detection system according to example 49 including one, or some, or all the features of the light detection system according to any one of examples 1 to 45.

Example 51 is a system including: a light detection system according to any one of examples 1 to 45, 47, 48, 49, or 50; and a light signal received at the light detection system.

In example 52, the system according to example 51 may optionally further include that the light signal includes one or more light pulses (e.g., one or more signal features of the light signal may include one or more light pulses).

In example 53, the system according to example 52 may optionally further include that at least one light pulse has a peak power in the range from 1 W to 100 W, for example in the range 10 W to 100 W.

In example 54, the system according to example 52 or 53 may optionally further include that at least one light pulse has a duration in the range from 0.1 ns to 100 ns, for example in the range from 1 ns to 100 ns. As an example at least one light pulse may have a duration of 50 ns.

In example 55, the system according to any one of examples 51 to 54 may optionally further include that the light signal includes a first light pulse and a second light pulse, and that combining the plurality of branched signals with one another includes providing a constructive combination of the first light pulse with the second light pulse.

In example 56, the system according to example 55 may optionally further include that the first light pulse and the second light pulse are spaced from one another by a time period, and that the processing circuit is configured to delay at least one branched signal with respect to another branched signal by a delay equal to the time period.

In example 57, the system according to example 56 may optionally further include that the time period between the first light pulse and the second light pulse is selected based on a deviation from an expected delay and an actual delay provided by the processing circuit for delaying the branched signal with respect to the other branched signal.

Example 58 is a method of detecting light, the method including: providing a received light signal; providing a plurality of branched signals each being representative of the received light signal; and combining the plurality of branched signals with one another to provide a combined signal, wherein the plurality of branched signals differ from one another in such a way that, as a result of the combination, respective signal components of the plurality of branched signals combine in a constructive manner and respective noise components of the plurality of branched signals combine in an at least partially destructive manner.

Example 59 is the method according to example 58 including one, or some, or all the features of the light detection system according to any one of examples 1 to 45.

While various implementations have been particularly shown and described with reference to specific aspects, it should be understood by those skilled in the art that various changes in form and detail may be made therein without departing from the spirit and scope as defined by the appended claims. The scope is thus indicated by the appended claims and all changes which come within the meaning and range of equivalency of the claims are therefore intended to be embraced.

The invention claimed is:

1. A light detection system comprising:
a detector configured to provide a received light signal; and
a processing circuit configured to:
provide a plurality of branched signals, each being representative of the received light signal and each being time delayed to one another and with respect to a non-delayed branched signal,
wherein a delay period between the plurality of branched signals is smaller than a duration of the received light signal, and wherein the delay period between the plurality of branched signals is chosen such that peaks of the branched signals overlap in time; and
sum up the plurality of branched signals including the non-delayed branched signal with one another to provide a combined signal,
wherein the plurality of branched signals differ from one another in such a way that, as a result of a summation, respective signal components of the plurality of branched signals combine in a constructive manner and respective noise components of the plurality of branched signals combine in an at least partially destructive manner.

2. The light detection system according to claim 1, wherein a number of branched signals is selected based on a ratio of a duration of the received light signal to a predefined delay period.

3. The light detection system according to claim 1, wherein a delay between different branched signals is such that, as a result of the summation, the signal components of the branched signals combine constructively and the noise components of the branched signals combine at least partially destructively.

4. The light detection system according to claim 1,
   wherein the received light signal comprises one or more signal features,
   wherein each branched signal comprises one or more respective signal features representing the one or more signal features of the received light signal, and
   wherein respective one or more signal features of a branched signal are time-shifted with respect to respective one or more signal features of each other branched signal.

5. The light detection system according to claim 1,
   wherein providing the plurality of branched signals comprises delaying the received light signal by one or more predefined delays, and
   wherein at least one predefined delay of the one or more predefined delays is in a range from 0.1 ns to 200 ns.

6. The light detection system according to claim 1,
   wherein the processing circuit comprises a delay stage configured to receive the received light signal and to output the plurality of branched signals,
   wherein the delay stage comprises one or more delay elements, each associated with a respective predefined delay.

7. The light detection system according to claim 6, wherein the processing circuit comprises a summation stage configured to:
   receive the plurality of branched signals, and
   output the combined signal.

8. The light detection system according to claim 7, wherein the processing circuit further comprises an impedance matching stage coupled between the delay stage and the summation stage, the impedance matching stage being configured to match an output impedance of the delay stage to an input impedance of the summation stage.

9. The light detection system according to claim 1, wherein the processing circuit is configured to combine the plurality of branched signals with a plurality of adjustable gains.

10. The light detection system according to claim 1, wherein the processing circuit is further configured to generate a trigger signal to stop a time of flight measurement associated with the received light signal by using a signal component of the combined signal.

11. The light detection system according to claim 1, wherein the light detection system further comprises a driver configured to provide impedance matching between an output impedance of the detector and an input impedance of the processing circuit.

12. A LIDAR system comprising:
   the light detection system according to claim 1.

13. A system comprising:
   the light detection system according to claim 1 configured to receive a light signal,
   wherein the light signal comprises a first light pulse and a second light pulse that are spaced from one another by a time period, and
   wherein the processing circuit is configured to delay at least one branched signal with respect to another branched signal by a delay equal to the time period.

14. The system according to claim 13, wherein the time period between the first light pulse and the second light pulse is selected based on a deviation from an expected delay and an actual delay provided by the processing circuit for delaying the branched signal with respect to the other branched signal.

15. A method of detecting light, the method comprising:
   providing a received light signal;
   providing a plurality of branched signals each being representative of the received light signal and each being time delayed to one another and with respect to a non-delayed branched signal,
   wherein a delay period between the plurality of branched signals is smaller than a duration of the received light signal, and
   wherein the delay period between the plurality of branched signals is chosen such that peaks of the branched signals overlap in time; and
   summing up the plurality of branched signals including the non-delayed branched signal with one another to provide a combined signal,
   wherein the plurality of branched signals differ from one another in such a way that, as a result of a summation, respective signal components of the plurality of branched signals combine in a constructive manner and respective noise components of the plurality of branched signals combine in an at least partially destructive manner.

16. The method according to claim 15, wherein a delay between different branched signals is such that, as a result of the combination, the signal components of the branched signals combine constructively and the noise components of the branched signals combine at least partially destructively.

* * * * *